United States Patent [19]

Hisamatsu et al.

[11] Patent Number: 6,167,020

[45] Date of Patent: Dec. 26, 2000

[54] ELECTRONIC APPARATUS, METHOD OF CONTROLLING ELECTRONIC APPARATUS, RECORDING AND/OR REPRODUCING APPARATUS FOR RECORDING MEDIA, AND METHOD OF CONTROLLING RECORDING AND/OR REPRODUCING APPARATUS FOR RECORDING MEDIA

[75] Inventors: Nobuaki Hisamatsu; Hiroyuki Kikkoji, both of Tokyo, Japan

[73] Assignee: Sony Corporation, Tokyo, Japan

[21] Appl. No.: 09/213,994

[22] Filed: Dec. 17, 1998

[30] Foreign Application Priority Data

Dec. 26, 1997 [JP] Japan .................................. 9-361499

[51] Int. Cl.⁷ ........................ G11B 17/22; G11B 33/04
[52] U.S. Cl. ................................. 369/178; 369/75.1
[58] Field of Search .............................. 369/34, 36, 38, 369/178, 191–194, 75.1; 360/92

[56] References Cited

U.S. PATENT DOCUMENTS

| 4,287,541 | 9/1981 | Tanahashi et al. | 360/92 |
| 5,038,331 | 8/1991 | Ogawa | 369/36 |
| 5,745,446 | 4/1998 | Akama et al. | 369/36 |

*Primary Examiner*—William Klimowicz
*Attorney, Agent, or Firm*—Limbach & Limbach L.L.P.; Seong-Kun Oh

[57] ABSTRACT

An electronic apparatus such as a disc changer, including a moving unit, locking mechanism, output unit and a control unit is provided. The moving unit is provided movably in relation to the enclosure. The locking mechanism locks the moving unit against dislocation in relation to the enclosure, and also the moving unit against dislocation from its initial position. The output unit issues an alarm. The control unit judges whether the moving unit stays at its initial position for more than a predetermined time, and controls the output unit to issue an alarm when the result of the judgement is such that the moving unit stays at the initial position for more than the predetermined time.

37 Claims, 13 Drawing Sheets

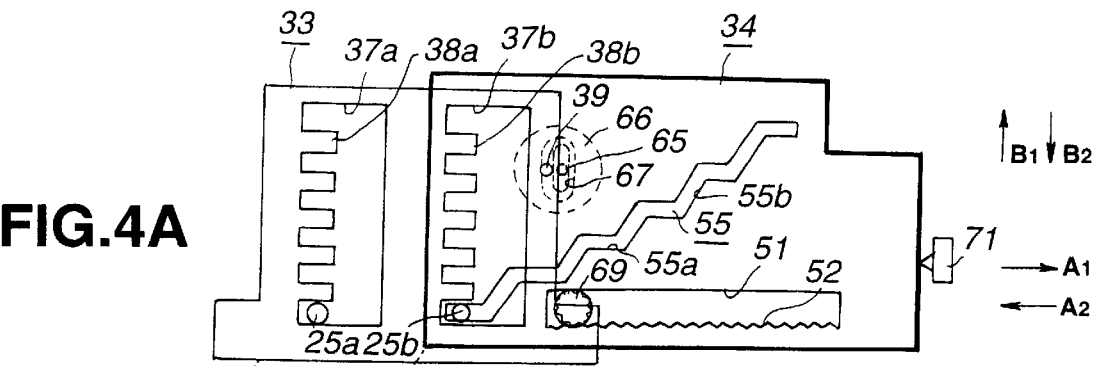
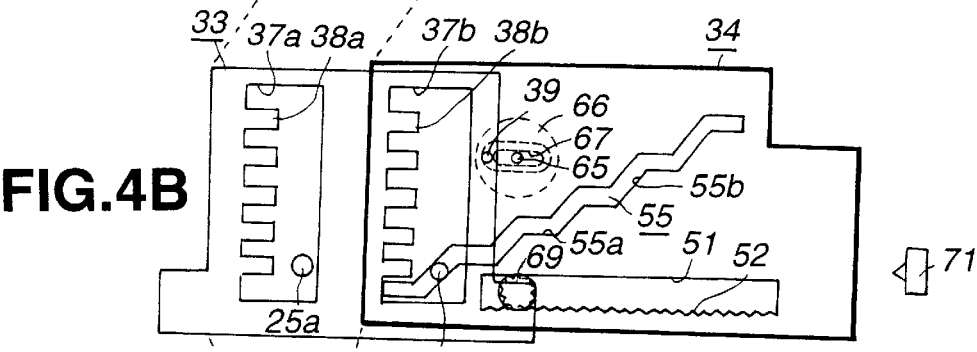
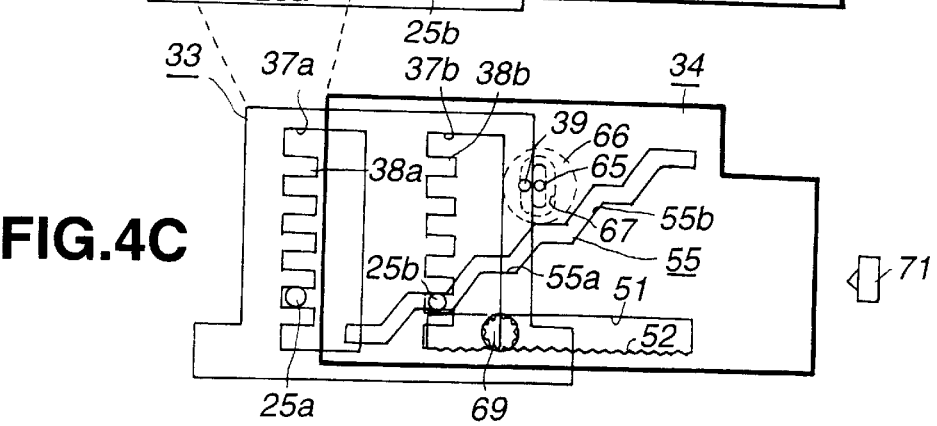

ELECTRONIC APPARATUS, METHOD OF CONTROLLING ELECTRONIC APPARATUS, RECORDING AND/OR REPRODUCING APPARATUS FOR RECORDING MEDIA, AND METHOD OF CONTROLLING RECORDING AND/OR REPRODUCING APPARATUS FOR RECORDING MEDIA

BACKGROUND OF THE INVENTION

1. Field of the Invention

The present invention relates to an electronic apparatus, a method of controlling the electronic apparatus, a recording and/or reproducing apparatus for recording media and a method of controlling the recording and/or reproducing apparatus for recording media. More particularly, the present invention concerns an electronic apparatus having moving components, a method of controlling the electronic apparatus, a recording and/or reproducing apparatus for recording media having moving components, and a method of controlling the recording and/or reproducing apparatus for recording media.

2. Description of Related Art

Conventionally, an electronic apparatus such as a disc changer, a printer, etc. which are adapted to select one of a plurality of discs for data recording and/or reproduction into and/or from the selected disc, is provided with a locking mechanism to prevent a moving component such as a disc or tray housing accomodating the plurality of discs, character printing head, etc. from being dislocated out of place due to vibration or the like during shipping from factory.

For instance, a disc changer comprises a disc housing accommodating a plurality of discs in a stacked relationship, a writing and/or reading unit to record and/or reproduce data into and/or from a one selected among the discs in a disc housing, a lifting mechanism to move up or down the disc housing between a position where a user-select ed be taken from inside the disc housing and a position where the optical disc is opposite to a writing and/or reading unit and thus can be fed into he unit, etc.

In the disc changer, after the user selects a desired one of the plurality of discs, the disc housing is moved up or down by the lifting mechanism between a position where a disc can be taken out of the disc housing and then transferred by a loading mechanism from its storing position inside the disc housing and a disc playing position inside the writing and/or reading unit. Thus, data is written into, and/or read from, the user's selected disc at the disc playing position.

In such a disc changer, the disc housing accommodating the discs is supported movably by the lifting mechanism. During shipping from factory, however, the disc changer is likely to be wobbled due to vibration and thus the disc housing is dislocated from its initial position, possibly causing a failure of the disc changer. To prevent such a failure, the disc changer is provided with a locking mechanism to lock the disc housing against wobbling due to vibration during shipping. The locking mechanism includes a locking member inserted from outside the enclosure and adapted for engagement onto an end face of a lifting control plate which controls lifting of the disc housing to lock the lifting control plate, and hence the disc housing. To use the disc changer provided with such a locking mechanism, the user himself or herself has to remove the locking member prior to using the disc changer. When the locking member is removed, the lifting control plate is freed for movement and thus the disc housing is allowed to be movable up and down.

When the user transports or carries the electronic apparatus such as the disc changer, printer or the like, the locking member will be able to lock the moving component in place and prevent the electronic apparatus from being wobbled by vibration during transport for relocation or removal from one to another site. However, the user who will use the electronic apparatus again at the new site may possibly forget to remove the locking member. In this case, when the electronic apparatus is stalled and the user may possibly believe that the electronic apparatus itself is defective.

Before the electronic apparatus of the above-mentioned type is shipped from the factory, the moving component is usually retained in place with its locking member at the factory to prevent the moving component from being wobbled by vibration and the electronic apparatus itself from getting defective. However, a user not well familiar with the mechanism and operation of such an electronic apparatus delivered to him, may possibly forget to remove the locking member before initially connecting the main power supply to the apparatus. In this case, when the apparatus is of course be stalled and thus the user will believe that the apparatus itself defective, as mentioned just above.

SUMMARY OF THE INVENTION

It is therefore an object of the present invention to provide an electronic apparatus which resolves the above-mentioned problem.

It is another object of the present invention to provide a method of controlling the electronic apparatus which resolves the above-mentioned problem.

It is a further object of the present invention to provide a recording and/or reproducing apparatus for recording media which resolves the above-mentioned problem.

It is a still another object of the present invention to provide a method of controlling the recording and/or reproducing apparatus for recording media which resolves the above-mentioned problem.

According to the present invention, there is provided an electronic apparatus including:

- a moving unit provided movably in relation to the enclosure;
- a locking mechanism adapted to lock the moving unit against dislocation from its initial position relative to the enclosure;
- an output unit to issue an alarm; and
- a control unit to judge whether the moving unit stays at its initial position for more than a predetermined time and control the output unit to issue an alarm, when the result of judgement is such that the moving unit stays at the initial position for more than the predetermined time.

According to the present invention, there is provided a method of controlling an electronic apparatus including a moving unit provided movably in relation to the enclosure and a locking mechanism to lock the moving unit against dislocation from its initial position relative to the enclosure, the method comprising the steps of:

- judging whether the moving unit stays at its initial position for more than a predetermined time;
- deciding, when the result of judgement is such that the moving unit stays at the initial position for more than the predetermined time, that the moving unit is locked by the locking mechanism; and
- issuing an alarm.

According to the present invention, there is provided a recording and/or reproducing apparatus for recording media including:

a recording medium housing adapted to accommodate a plurality of trays each receiving a recording medium so that each tray can be moved between a position to be taken by the tray when taken out of the housing and a position to be taken by the tray when stored in the housing;

a unit to record and/or reproduce data into and/or from a recording medium set on a tray taken out of the housing;

a moving mechanism to move one of the trays between the taken-out and stored positions and also the housing and writing and/or reading unit in relation to each other;

a locking mechanism installed to the enclosure to lock the moving mechanism against dislocation from its initial position relative to the enclosure;

an output unit to issue an alarm; and a control unit to judge whether the moving mechanism stays at its initial position for more than a predetermined time and control the output unit to issue an alarm, when the result of judgement is such that the moving mechanism stays at the initial position for more than the predetermined time.

According to the present invention, there is provided a method of controlling the recording and/or reproducing apparatus for recording media including a recording medium housing adapted to accommodate a plurality of trays each receiving a recording medium so that each tray can be moved between a position to be taken by the tray when taken out of the housing and a position to be taken by the tray when stored in the housing, a unit to record and/or reproduce data into and/or from a recording medium on a tray taken out of the housing, a moving mechanism to move one of the trays between the taken-out and stored positions, and also the housing and writing and/or reading unit in relation to each other, and a locking mechanism installed to the enclosure to lock the moving mechanism against dislocation from its initial position relative to the enclosure, the method comprising the steps of:

judging whether the moving mechanism stays at its initial position for more than a predetermined time; and deciding, when the result of judgement is such that the moving mechanism stays at the initial position for more than the predetermined time, that the moving mechanism is locked by the locking mechanism; and and issuing an alarm.

BRIEF DESCRIPTION OF THE DRAWINGS

These objects and other objects, features and advantages of the present intention will become more apparent from the following detailed description of the present invention applied to a disc changer, by way of example, when taken in conjunction with the accompanying drawings:

FIGS. 4(A) to 4(C) illustrate together the operation of the lifting mechanism.

DETAILED DESCRIPTION OF THE PREFERRED EMBODIMENTS

Figure 1:
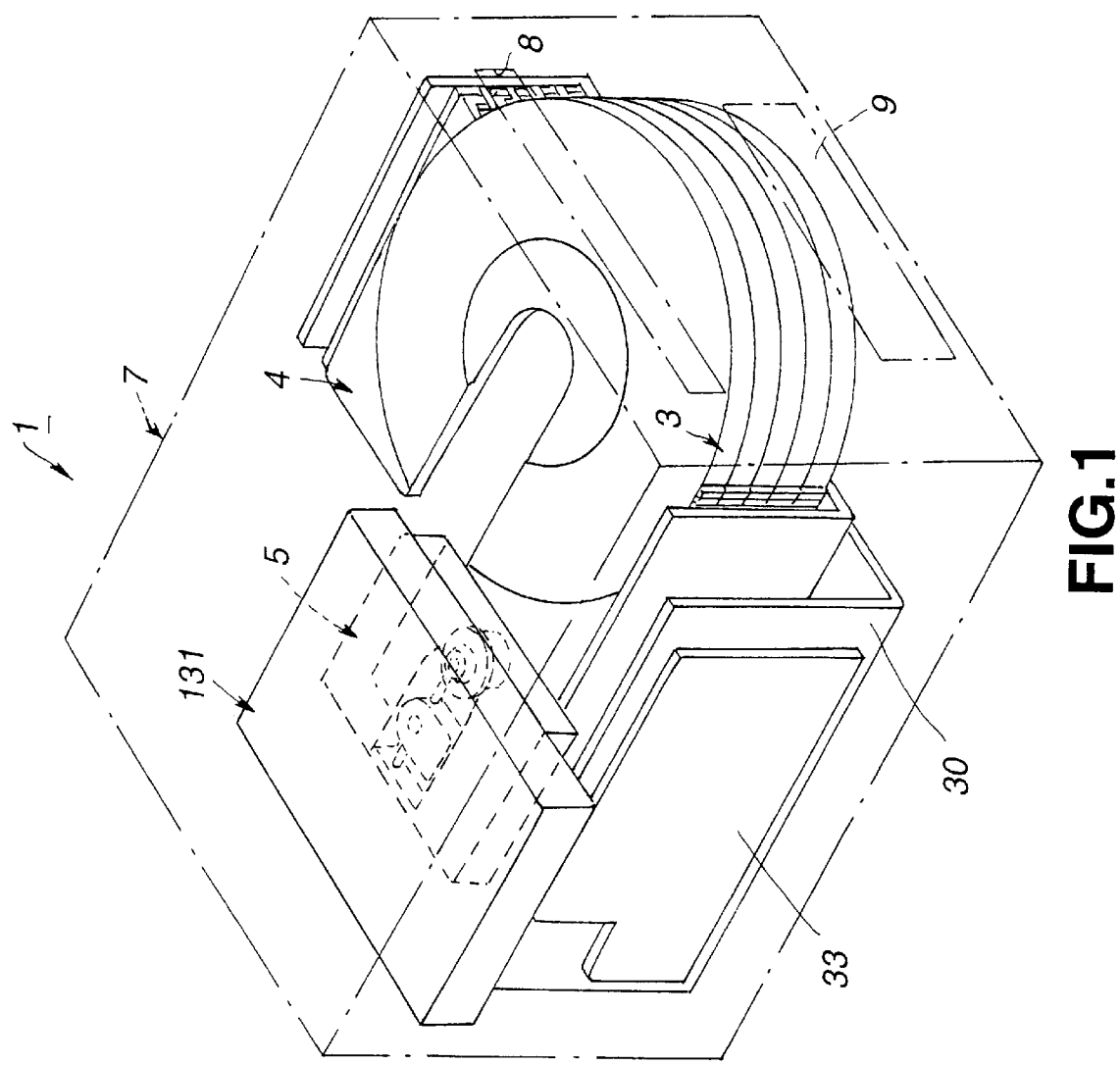
FIG. 1 is a schematic perspective general view of a disc changer according to the present invention.

Referring now to FIG. 1, a disc changer generally indicated with a reference 1 comprises disc trays 3 each receiving an optical disc 2, a disc housing 4 accommodating, in a parallel and stacked relationship, the optical discs 2 on the disc trays 3, a reproducing unit 5 to reproduce data from a one selected from the plurality of optical discs 2 accommodated in the disc housing 4, and a lifting mechanism 6 for moving up and down the disc housing 4.

In this disc changer 1, when one of the plurality of optical discs 2 accommodated in the disc housing 4 is selected under the control from the control panel, the disc housing 4 is moved up or down by the lifting mechanism 6 until the selected disc 2 in the disc housing 4 is opposite to the reproducing unit 5. Then, the disc tray 3 with the selected disc 2 is carried by a loading mechanism from the stored position in the disc housing 4 to a position from which the optical disc 2 is to be loaded into the reproducing unit 5, and the selected disc 2 is loaded into the reproducing unit 5. The optical disc 2 on the disc tray 3 is driven to spin while an optical pickup is fed radially of the optical disc 2, to reproduce information such as audio signal or the like recorded in the optical disc 2.

The disc changer 1 has formed at the front of an enclosure 7 thereof a disc slot 8 through which an optical disc 2 on a disc tray 3 is to be loaded or ejected. The user going to try a new optical disc may replace the one ejected from the disc slot 8 with his new one and load the new optical disc into the disc changer 1 through the disc slot 8 again. Thus the existing optical discs 2 accommodated in the disc housing 4 can be replaced in this way.

Figure 2:
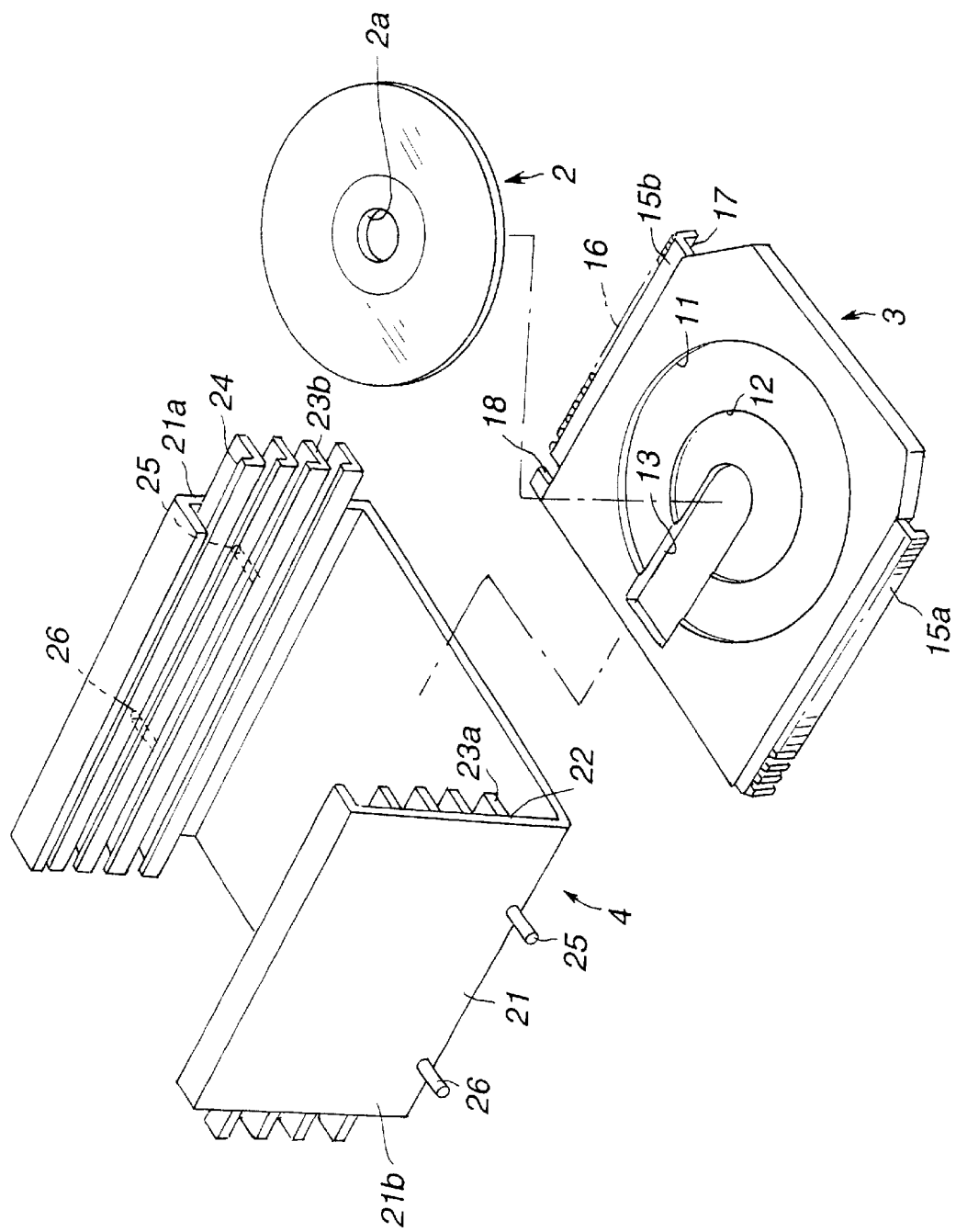
FIG. 2 is a perspective view of a disc tray and a disc housing accommodating the disc trays.

Further, the enclosure 7 has provided at the front thereof a display unit 9 adapted to indicate a playing time and address of the optical disc 2 under reproduction, a current time, etc. as shown in FIG. 2.

The optical disc 2 used with this disc changer 1 is a read-only one having information signal such as audio signal recorded previously therein and a diameter of 12 cm or 8 cm. The optical disc 2 has formed in the center thereof a center hole 2a into which a centering member provided in the center of a disc table in the reproducing unit 5 is to be engaged.

As shown in FIG. 2, each of the disc trays 3 accommodated in a stacked relationship in the disc housing 4 and each receiving an optical disc 2 is shaped to have a generally rectangular form like a plate. It has formed generally in the entire main surface thereof a disc receiving concavity 11 in which an optical disc 2 is received or held. The disc receiving concavity 11 is shaped to have a circular form having a diameter somewhat larger than that of an optical disc 2 to receive an optical disc having a diameter of 12 cm. The disc receiving concavity 11 further has formed therein an auxiliary disc receiving concavity 12 concentric with, and of a smaller diameter than that of, the disc receiving concavity 11 to receive an optical disc of 8 cm in diameter. The disc receiving concavity 11 has also a bottom opening 13 formed from the center of the concavity 11 to the rear end of the disc tray 3. A disc table of the reproducing unit 7, which will be described later, will enter in this bottom opening 13, and an optical pickup to read the optical disc 2 will be exposed inside the bottom opening 13.

The disc tray 3 have a pair of guide rails 15a and 15b formed along opposing edges thereof and extending in the moving direction thereof. The guide rails 15a and 15b guide the disc tray 3 being moved into and out of the enclosure 7. One of the guide rails 15a and 15b has a rack gear 16 formed thereon. The rack gear 16 is to be engaged with an ejecting mechanism which moves the disc tray 3 between a stored position inside the disc housing 4 and a disc exchanging position outside the enclosure 7. The guide rail 15a has formed in the bottom thereof a guide recess 17 in which a guide provided at the reproducing unit 5 is to be engaged when the disc tray 3 is moved into the reproducing unit 5. The guide rail 15a has also formed in the rear end portion thereof an engagement cut 18 in which there is engaged a loading mechanism which moves the disc tray 3 to the reproducing unit 5.

As seen from FIG. 1, the disc housing 5 accommodating the optical discs 2 received on the above-mentioned disc trays 3, respectively, with their main surfaces in a parallel and stacked relationship, is designed to accommodate five pieces of such disc tray 3, for example. As seen from FIG. 2, the disc housing 4 comprises a generally U-shaped casing 21 of which the front is opposite to the disc slot 8, the rear is at the side of the reproducing unit 5 and the ceiling is open. The casing 21 defines a tray or disc compartment 22 therein. The tray compartment 22 is formed from side walls 21a and 21b parallel to the moving direction of the disc tray 3 and having tray guides 23a and 23b provided thereon, respectively. The tray guides 23a and 23b are disposed for receiving five disc trays 3. Also, the tray guides 23a and 23b are regularly spaced from each other with an inter-guide space nearly same as the thickness of the disc tray 3. Thus the tray guides 23a dn 23b are disposed along the moving direction of the disc trays 3, and are projected at the front and rear portions thereof from the casing 21. Further, they are cut open at the opposite side walls 21a and 21b for introduction of the loading and ejecting mechanisms. Each of the tray guides 23a has formed along the inner edge thereof a rising guide projection 24. The guide projection 24 is to be engaged in the guide recess 17 formed in the guide rail 15a of the disc tray 3 to guide the disc tray 3 for movement.

The side walls 21a and 21b of the casing 21 are provided with first support pins 25a and 26a, and 25b and 26, respectively, which are to be supported on the lifting mechanism 6 which moves up and down the disc housing 4. The disc housing 4 for five disc trays 3 has been described with reference to FIG. 2. However, this number of disc trays 3 is not limited to five but it may be two or more.

Figure 3:
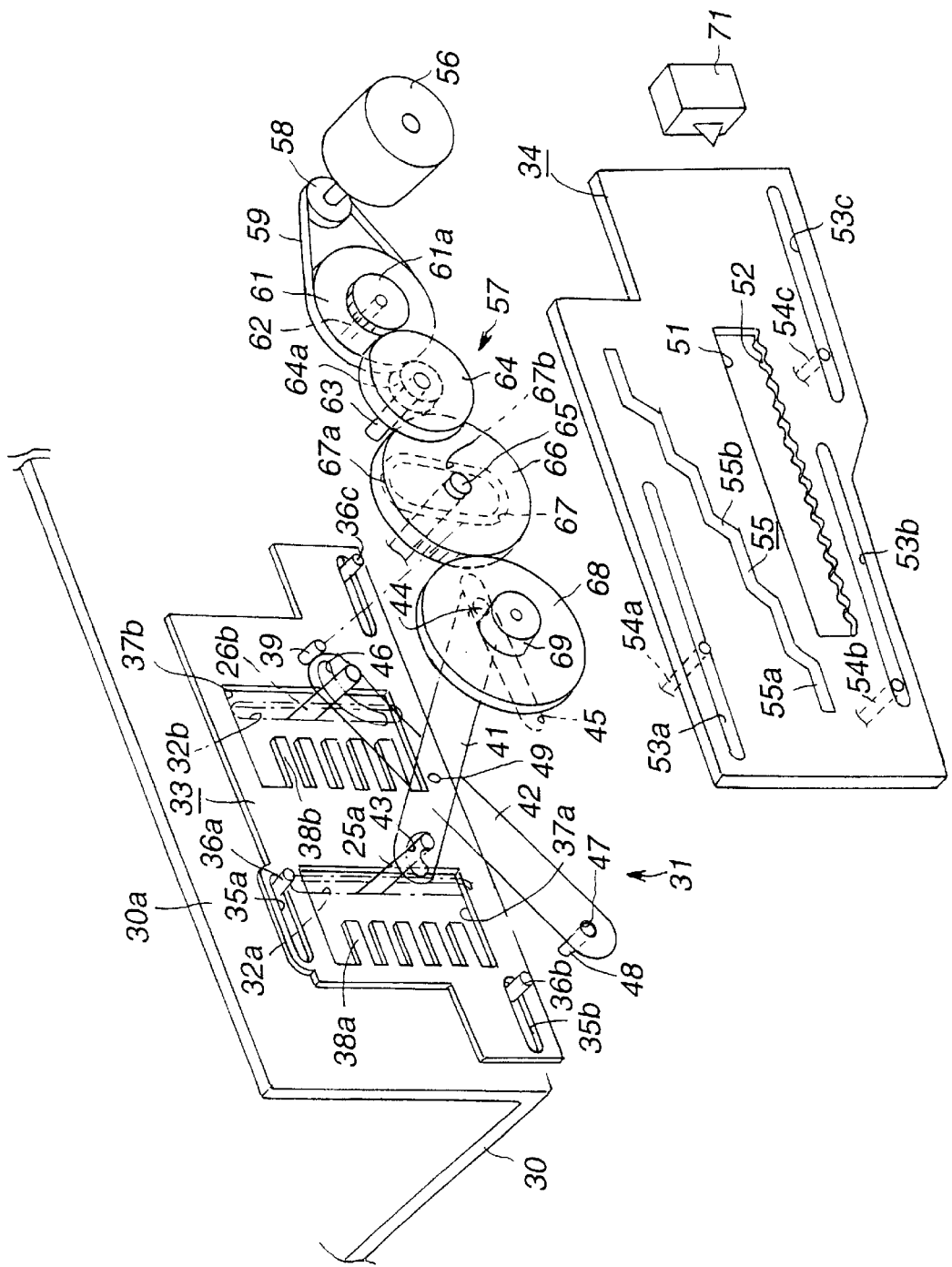
FIG. 3 is an exploded perspective view of a disc housing lifting mechanism, showing the essential parts thereof selected of for the purpose of explanation.

Next, the lifting mechanism 6 which supports and moves up ad down the disc housing 4 will be described here below with reference to FIG. 3. FIG. 3 illustrates the lifting mechanism 6 for a side wall 30a of a chassis 30. There is also provided a lifting mechanism 6 at a side wall 30b of the chassis 30. It is identical in construction to that at the side wall 30a. Therefore, the lifting mechanism 6 at the side wall 30a of the chassis 30 will mainly be described in the following but the one at the side wall 30b will not be described any longer for the simplicity of the illustration and description.

In the enclosure 7, the tray or disc housing 4 is disposed between the side walls 30a and 30b of the chassis 30 that are parallel to the moving direction of the disc tray 3. First support pins 25a and 25b and second support pins 26a and 26b are provided in pairs, respectively, at the lower end portions, respectively, of the side walls 21a and 21b of the casing 21. They are introduced into lifting guide slots 32a and 32b, respectively, formed in the side walls 30a and 30b of the chassis 30 in a vertical direction perpendicular to the moving direction of the disc tray 3. The casing 21 is moved up and down along the lifting guide slots 32a and 32b.

The lifting mechanism 6 comprises a pair of supporting plates 33 provided on the outer surface of the side wall 30a movably in the moving direction of the disc tray 3 and which support the disc housing 4, and a pair of lifting plates 34 provided movably in the moving direction of the disc tray 3 and which lift the disc housing 4.

Each of the supporting plates 33 is shaped like a plate, and has a moving guide slot 35a formed in the upper central portion thereof and similar moving guide slots 35b and 35c formed in the opposing lower end portions thereof. The moving guide slots 35a, 35b and 35c are to have inserted therein support pins 36a, 36b and 36c, respectively, provided on the outer surface of the side wall 30a and 30b of the chassis 30. Each supporting plate 33 is movable within a range defined by the moving guide slots 35a, 35b and 36c.

The supporting plate 33 has a pair of rectangular openings 37a and 37b formed in parallel in the moving direction. The openings 37a and 37b have multiple steps of support projections 38a and 38b, respectively, horizontally extending from the side edge thereof at the front side of the enclosure 7. The support projections 38a and 38b support the first support pins 25a and 25b, and second support pins 26a and 26b on their respective upper surfaces. In FIG. 3, the support projections 38a and 38b count a total of five in number, respectively. The pins 25a and 26b are supported on a total of six levels, respectively. The lowest level is the initial position for the disc housing 4, the disc housing 4 can support itself most stably. The disc housing 4 is returned to this initial position when the main power supply is connected to the disc changer 1. Also in this initial position, a disc tray 3 can be taken out from the uppermost first address, and also stored at the same address in the disc housing 4.

The above-mentioned supporting plate 33 is moved to the rear side of the enclosure 7 and between a position where the first support pins 25*a* and 25*b* and second support pins 26*a* and 26*b*, respectively, are supported on the support projections 38*a* and 38*b*, respectively, and a position where the first support pin 25*a* (25*b*) and second support pin 26*a* (26*b*) are not supported on the support projections 38*a* and 38*b*, respectively.

The supporting plate 33 has studded thereon near the opening 37*b* an engagement pin 39 which is engaged in a cam groove 67 formed in a cam gear 66 which will be further described later. The lifting plate 34 is moved in the moving direction of the disc tray as the cam gear 66 is rotated.

The supporting plate 33 has installed on the outer surface thereof a first pivot arm 41 and second pivot arm 42 intersecting each other nearly in the middle thereof. The intersecting point serves as a pivot. The first pivot arm 41 has formed in one end portion thereof an arcuate guide hole 43 in which the first support pin 25*a* of the disc housing 4 is engaged through the opening 37*a* to support the disc housing 4, and provided in the other end portion thereof a guide shaft 44 which is engaged into a guide slot 45 formed in the lower portion of the side wall 30*a* of the chassis 30. The second pivot arm 42 has formed in one end portion thereof an arcuate guide hole 46 in which the second support pin 26*a* of the disc housing 4 is engaged through the opening 37*b* to support the disc housing 4, and in the other end portion a hole 47 in which there is fitted a support shaft 48 studded at the lower portion of the side wall 30*a* of the chassis 30. The first and second pivot arms 41 and 42 are supported pivotally by the support shaft 49 nearly at the central points thereof, respectively. As the second pins 26*a* and 26*b* are moved up and down by the lifting plate 34, the first and second pivot arms 41 and 42 are also moved up and down.

The lifting plate 34 has formed nearly in the middle thereof a rectangular opening 51 whose lower edge is formed as a rack gear 52. A gear 69 of a lifting gear 68, which will be further described later, is in mesh with the rack gear 52 to move the lifting plate 34 in a same direction as the moving direction of the disc tray 3. The lifting plate 34 has an moving guide slot 53*a* formed in the upper portion thereof and other moving guide slots 53*b* and 53*c* formed at two places in the lower portion thereof. Guide pins 54*a*, 54*b* and 54*c* provided on the side walls 30*a* and 30*b* of the chassis 30 correspondingly to the moving guide slots 53*a*, 53*b* and 53*c* are engaged in the guide slots 53*a*, 53*b* and 53*c*, respectively. The lifting plate 34 is thus moved within a range defined by the moving guide slots 534*a*, 53*b* and 53*c*.

The lifting plate 34 has formed in the inner surface thereof a cam groove 55 along which the disc housing 4 is moved up and down. The cam groove 55 consists of horizontal steps 55*a* and slopes 55*b*. The horizontal steps 55*a* count six in number including a lowermost one on which the disc housing 5 is to be initially positioned and the number of disc trays 3 to be accommodated in the disc housing 4. The cam groove 55 ascends from the front toward rear of the enclosure 7. The second support pin 26*a* (26*b*) is engaged in the cam groove 55. Therefore, the cam groove 55 serves to move upward the disc housing 4 as the lifting plate 34 is moved from the front toward rear of the enclosure 7.

The supporting plate 33 and lifting plate 34 of the lifting mechanism 6 are applied with a driving force from a lifting drive motor 56 via a transmission 57 which will be described below. A driving force of the motor 56 is transmitted to a driven pulley 61 on which a driving belt 59 is wound, via the driving belt 59 also wound on driving pulleys 58 installed to a drive shaft of the motor 56. The driven pulley 61 is pivoted to a support shaft 61 studded on the side wall 30*a* of the chassis 30. The driven pulley 61 has a smaller-diameter gear 61*a* provided coaxially and integrally therewith. A transmission gear 64 installed to one end of a support shaft 63 supported rotatably on the side walls 30*a* and 30*b* opposing the gear 61*a* is in mesh with the gear 61*a*. The transmission gear 64 has a smaller-diameter gear 64*a* provided integrally therewith. A cam gear 66 installed on a support shaft 65 supported rotatably between the side walls 30*a* and 30*b* is in mesh with the gear 64*a*.

The support shaft 65 has installed on the other end thereof a cam gear (not shown) 66 as well. The cam gears 66 installed on the opposite ends of the support shaft 65 are driven by the drive motor 56 to rotate in a same direction.

The cam gear 66 has formed therein a cam groove 67 in which the engagement pin 39 of the supporting plate 33 is engaged. The cam groove 67 consists of a circular portion 67*a* formed in the direction of width and a straight portion 67*b* formed in the lengthwise direction. The engagement pin 39 is engaged in the circular portion 67*a* of the cam gear 67 to move the supporting plate 33 to the unsupported position when the cam groove 67 is directed laterally toward the front of the enclosure 7, and in the straight portion 67*b* to move the supporting plate 33 to the supported position when the enclosure 7 is directed longitudinally. The supporting plate 33 is reciprocated twice while the cam gear 66 is rotated one turn.

There is also provided a lifting gear 68 installed on a support shaft (not shown) studded on the side wall 30*a* (30*b*) and which is in mesh with the cam gear 66. The lifting gear 68 has a smaller-diameter gear 69 provided coaxially and integrally therewith and which is introduced into the opening 51 formed in the lifting plate 43 and put in mesh with the rack gear 52. The cam gear 66 is applied with the driving force from the drive motor 56 and thus rotated to move the lifting plate 34 in a same direction as the moving direction of the disc tray 3, thus moving up and down the disc housing 4.

The lifting mechanism 6 is provided with a microswitch 71 to detect the initial position of the lifting plate 34. The initial position detecting switch 71 is pressed by the end face of the lifting plate 34 at the rear side of the enclosure 7 only when the lifting plate 34 is positioned nearest to the rear side of the enclosure 7 and the disc housing 4 stays at the lowest step where it can support itself most stably. Thus, when the main power supply is connected to the disc changer 1, the switch 71 detects the position of the lifting plate 34 and whether the lifting plate 34 is in the initial position.

An example to reproduce data from the optical disc 2 stored at the first address in the disc housing 4, where the lifting mechanism 6 lifts up the disc housing 4 from the initial position to a one-step higher level will be discussed hereinbelow with reference to FIGS. 4(A) to 4(C) showing together the relationship between the supporting and lifting plates 33 and 34. FIGS. 4(A) to 4(C) also show the lifting mechanism 6 when lifting the disc housing 4 between a height at which the disc tray 3 stored at the uppermost first address in the disc housing 4 can be ejected and a height at which the first-address disc tray 3 can be moved to the clamping mechanism.

The disc housing 4 is at the lowest position where it can support most stably while the main power supply is disconnected from the disc changer 1. As shown in FIG. 4(A), since the elongated cam groove 67 in the cam gear 66 is directed longitudinally, the supporting plate 33 is supported in a position at the rear side of the enclosure 7 to which it has been moved in the direction of arrow $A_1$ in FIG. 4(A). Therefore, the first support pins 25a and 25b and second support pins 26a and 26b are engaged in corresponding concavities defined between the lowest support projections 38a and 38b and the lower edges of the openings 37a and 37b. The lifting plate 34 has been moved most in the direction of arrow $A_1$ in FIG. 4(A), and the second pins 26a and 26b are engaged on the lowest horizontal step 55a of the cam groove 55 in the lifting plate 34. Only in this situation, the initial position detecting switch 71 is pressed by the side edge of the lifting plate 34.

As shown in FIG. 4(B), as the drive motor 56 is driven in one direction, the cam gear 66 is rotated and the cam groove 67 is directed laterally to move the supporting plate 33 in the direction of arrow $A_2$ in FIG. 4(A) to the supported position. Thus, the first support pins 25a and 25b and second support pints 26a and 26b are not supported on the support projections 38a and 38b. Also, the lifting gear 68 is rotated in the one direction to move the lifting plate 34 in the direction of arrow $A_2$ in FIG. 4(A) and the second support pints 26a and 26b along the cam groove 55 to the slope 55b. Thus, the disc housing 4 is lifted up by the first and second pivot arms 41 and 42. That is to say, when the disc housing 4 is lifted, the supporting plate 33 is moved to the unsupported position while the lifting plate 34 is moved for the second support pins 26a and 26b to engage on the slope 55b.

Further, as the drive motor 56 is continuously driven in the one direction, the cam gear 66 is rotated and the cam groove is directed longitudinally again as shown in FIG. 4(C) so that the supporting plate 33 is moved in the direction of arrow $A_1$ in FIG. 4(A) back to the supported position. The lifting plate 34 is further moved in the direction of arrow $A_2$ and the second support pins 26a and 26b are moved to the second horizontal step 55a counted from the bottom of the cam groove 55. Thus, the disc housing 4 is lifted up a predetermined distance from a position as shown in FIG. 4(A), and the first support pins 25a and 25b and second support pins 26a and 26b are supported on the second support projections 38a and 38b, respectively, counted from the bottom of the cam groove 55.

Namely, when in the unsupported position where the first support pins 25a and 25b and second support pins 26a and 26b are not supported by the supporting plate 33 in the lifting mechanism 6, the disc housing 4 is lifted up by the lifting plate 34. In this condition, the supporting plate 33 is returned to the supported position from this position, and thus the disc housing 4 is supported at a predetermined height, namely, at a height where a certain disc tray 3 in the disc housing 4 is opposite to the reproducing unit 5.

Next, there will be described with reference to FIG. 5 a loading mechanism 81 adapted to selected one of the plurality of disc trays 3 accommodated in the disc housing 4 and load it into the reproducing unit 5. The loading mechanism 81 comprises a moving block 83 supported on a guide shaft 82 installed on the side wall 30a of the chassis 30 movably in parallel to the moving direction of the disc tray 3. The guide shaft 82 supporting the moving block 83 is shaped to have a prism-like section and installed in parallel to the outer surface of the side wall 30a. The moving block 83 is molded as one piece from a synthetic resin, has a guide hole 84 through which the guide shaft 82 is inserted. The moving block 83 can be guided on the guide shaft 82 inserted into the guide hole 84, and moved in a direction parallel to the plane of the disc tray 3 accommodated in the disc housing 4.

The moving block 83 has an engagement projection 85 directed toward the side wall 30a. The engagement projection 85 extends into the chassis 30. through a cut 86 formed along the guide shaft 82. When the moving block 83 is positioned at the front of the guide shaft 82 at the left of FIG. 5, the engagement projection 85 extends into the disc housing 4 and engaged in the engagement cut 18 formed in one of the disc trays 3 accommodated in a stacked relationship in the disc housing 4.

The disc trays 3 are stacked with their flat faces placed to oppose each other in the disc housing 4, so the engagement cuts 18 in the disc trays 3 are positioned vertically in line with each other. Therefore, the disc housing 4 can be moved up and down by the lifting mechanism 6 even if the engagement projection 85 is engaged in the engagement cut 18.

Figure 5:
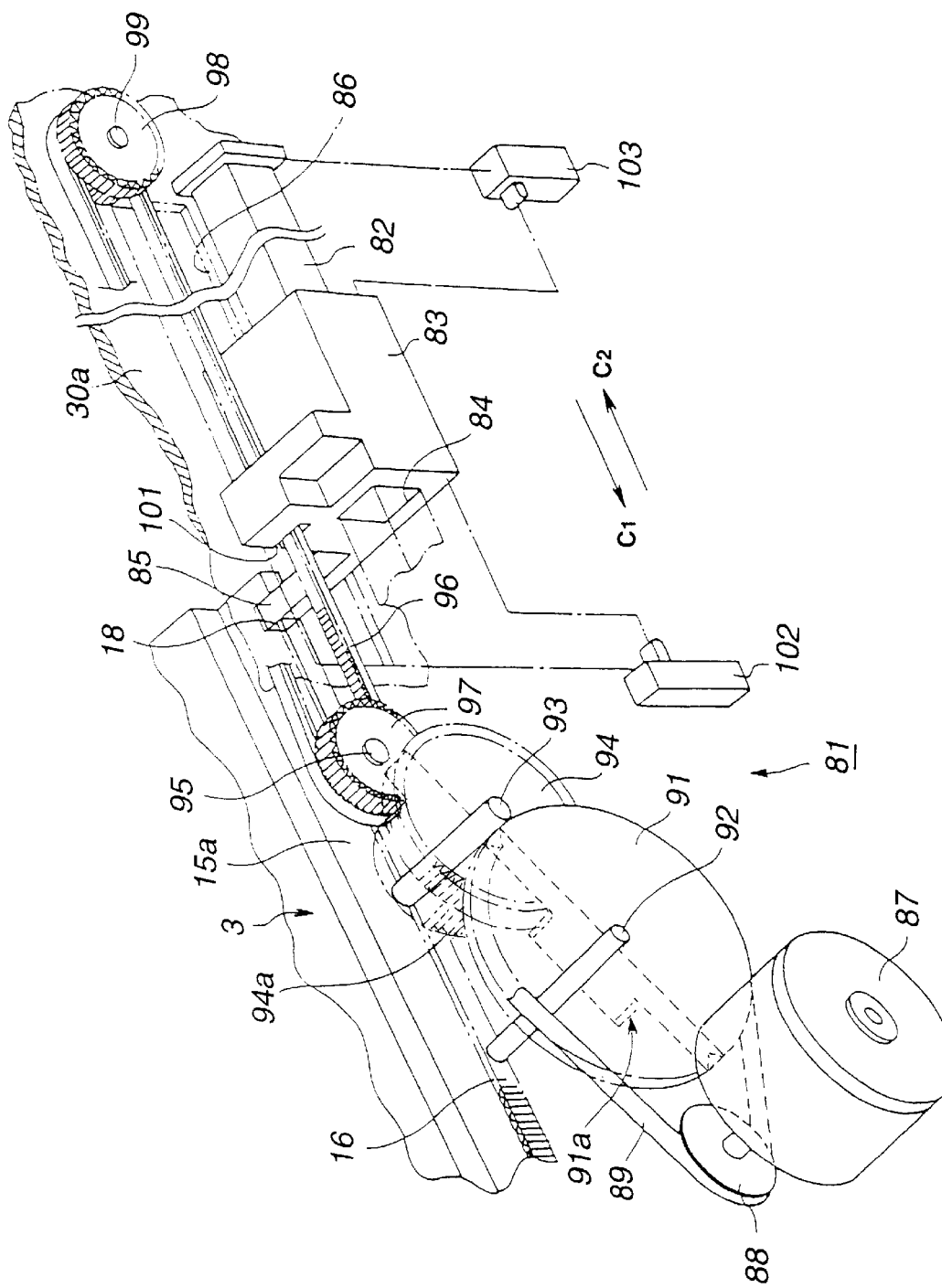
FIG. 5 is a perspective view of a loading mechanism adapted to move the disc tray between the disc housing and a disc reproducing unit, showing the essential parts thereof selected for the purpose of explanation.

The moving block 83 is moved by a loading drive motor 87 installed on a base (not shown) provided integrally with the side wall 30a, in the direction of arrow $C_1$ or $C_2$ in FIG. 5 parallel to the moving direction of the disc tray 3. A driving force of the loading drive motor 87 is conveyed to a driven pulley 91 by a driving belt 89 wound on driving pulleys 88 installed to the driving shaft of the loading drive moor 89. The driven pulley 91 is installed rotatably to the side wall 30a by means of a support shaft 92. The driven pulley 91 has a gear 91a formed integrally therewith. The gear 91a is put in mesh with a transmission gear 94 installed rotatably on a support shaft 93 studded on the side wall 30a. The transmission gear 94 has a smaller-diameter gear 94a provided integrally therewith. The small-diameter gear 94a is in mesh with a first timing gear 97 pivoted to a support shaft 95 studded on the side wall 30a and on which a timing belt 96 is wound. The first timing gear 97 is installed near the front end of the cut 86. There is also provided near the rear end of the cut 86 a second timing gear 98 pivoted to a support shaft 99 studded on the side wall 30a and on which the timing belt 96 is wound.

As mentioned above, the timing belt 96 is wound over the first and second timing gears 97 and 98. The intermediate portion of the timing belt 96 is inserted in a recess 101 formed in one side of the moving block 83 and joined to a side of the moving block 83 where the recess 101 does not exist. Thus the timing belt 96 is connected to the moving block 83. Therefore, as the timing belt 96 is driven by the loading drive motor 87, the moving block 83 is moved along with the timing belt 96 in the direction of arrow $C_1$ or $C_2$ in FIG. 5. With the engagement projection 85 engaged in the engagement cut 18 in one disc tray 3 accommodated in the disc housing, the moving block 83 is moved along the guide shaft 82 toward the vertical wall of the enclosure 7, so that the disc tray 3 is taken out of the disc housing 4 and moved in the direction of arrow $C_2$ in FIG. 5. Namely, with the moving block 83 having been moved in the direction of arrow $C_1$ in FIG. 5 toward the disc housing 4, a desired one of the plurality of disc trays 3 is taken out of the disc housing 4 by the loading mechanism 81.

There is disposed at the front of the side wall 30a at the left of FIG. 5 a stored position detecting microswitch 102 which allows a disc tray 3 to be taken out of the disc housing 4 when the moving block 83 is moved in the direction of arrow $C_1$ in FIG. 5 or is pressed by the moving block 83 when a disc tray 3 once taken out of the disc housing 4 is moved to a position for storage thereof into the disc housing 4. Also there is provided at the rear of the side wall 30a at the right of FIG. 5 an ejected position detecting microswitch 103 which is pressed by the moving block 83, when a disc tray 3 taken out of the disc housing 4 is moved to a loading position as the moving block 83 is moved in the direction of arrow $C_2$ in FIG. 5, to detect when the extract disc tray 3 has arrived at the loading position.

Figure 6:
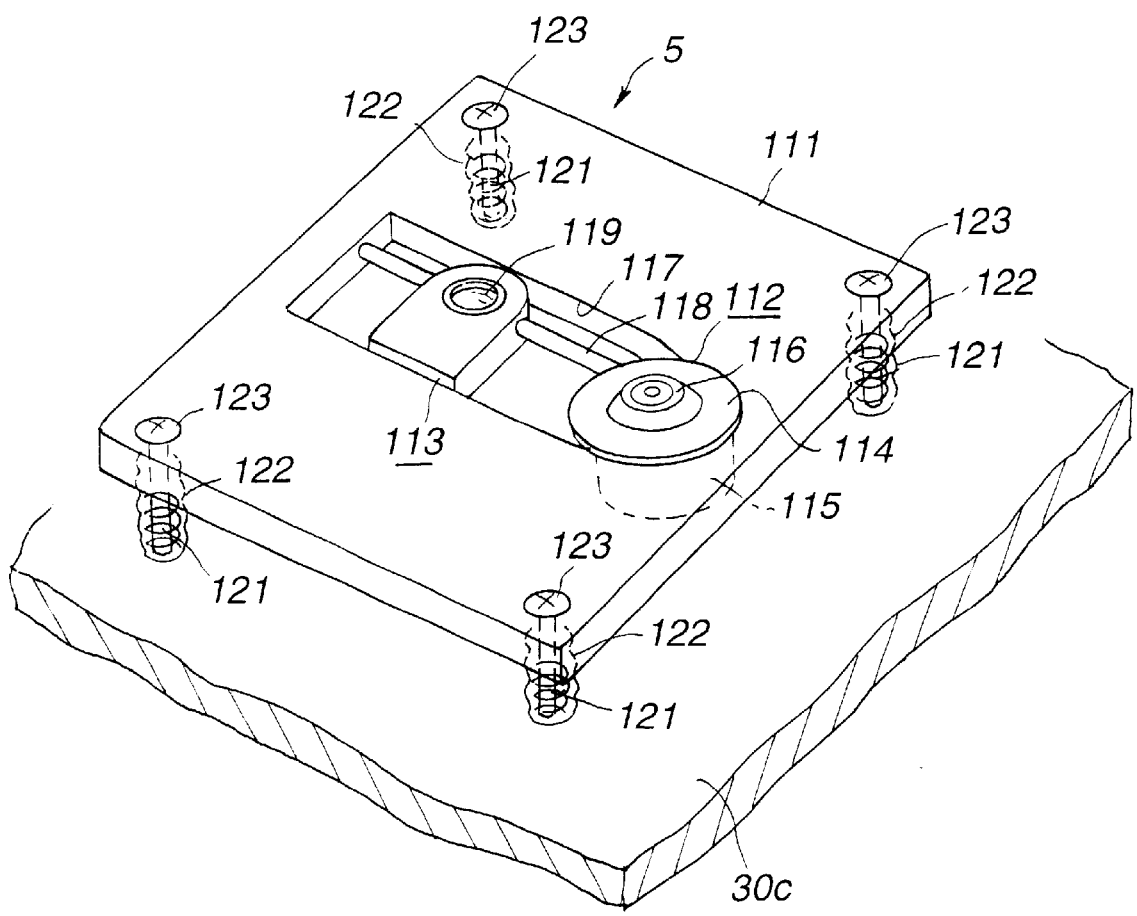
FIG. 6 is a perspective view of an optical disc reproducing unit, showing the essential parts thereof selected for the purpose of explanation.

Next, the reproducing unit 5 to read information signal recorded in the optical disc 2 will be described with reference to FIG. 6. The reproducing unit 5 has a base 111 installed on a bottom 30c of the chassis 30. The base 111 incorporates a disc spinner 112 for the optical disc 2, an optical pickup 113, and so on.

The disc spinner 112 comprises a disc table 114 on which the optical disc 2 is to be placed, and a spindle motor 1 15 to drive the disc table 114. The spindle motor 115 is installed on the bottom of the base 26 with its drive shaft projected to the upper side on which the optical disc 2 is to be set. The disc table 114 is installed on the top end of the drive shaft. The disc table 114 is shaped to have a generally disc-like form and has a conical centering member 116 provided in the center of the top surface thereof The disc table 114 has also disposed thereon a magnet which attracts a clamping plate of a clamping mechanism to clamp the optical disc 2 along with the disc table 114. The clamping mechanism will be further described later. The optical disc 2 is placed on the disc table 114 and clamped by the clamping plate and disc table 14 so that the disc table 114 carrying the optical disc 2 thereon is driven to spin by the spindle motor 115.

The optical pickup 114 is installed in an opening 117 of the base 111 to thus view the optical disc 2. The optical pickup 113 is supported on a guide shaft 118 supported on the base 111. It is driven by a pickup feeding mechanism (not shown) to move on the guide shaft 118 radially of the optical disc 2 set on the disc table 114. The optical pickup 113 irradiates a light beam from a semiconductor laser source or the like provided in an optical block onto the signal recording layer of the optical disc 2 on the disc table 114 through an objective lens 119, and detects a return light reflected at the signal recording layer of the optical disc 2 by a photodetector provided in the optical block, thereby reading information signal from the optical disc 2.

The base 111 is installed on the top ends of a plurality of support legs 121 studded on the bottom 30c of the chassis 30. A damper 122 provided between each of the top ends of the support legs 121 and the base 111 permit to support the base 111 incorporating the disc spinner 112, optical pickup 113, etc. to be elastically deflectable on the bottom 30c. The support legs 121 are fixed to the bottom 30c with fixing screws 123 penetrated through the base 111.

In the reproducing unit 5, when the disc tray 3 carrying the optical disc 2 thereon is clamped by the loading mechanism 81, the centering member 116 is engaged into the center hole 2a of the optical disc 2. The optical disc 2 is driven by the spindle motor 115 to spin while the optical pickup 113 is fed radially of the optical disc 2, thereby reproducing information signal recorded in the optical disc 2.

Next, the clamping mechanism 131 to clamp in the reproducing unit 5 a disc tray 3 taken out of the disc housing 4 by the loading mechanism 81 will be described with reference to FIG. 7.

The clamping mechanism 131 comprises a clamping unit 132 which retains the disc tray 3 taken out of the disc housing 4. The clamping unit 132 is shaped like a thin square box. It is comprised of a top plate 133 and bottom plate 134 between which a space 135 is defined to hold the disc tray 3. As shown, the clamping unit 132 is open at the front side thereof opposing the disc housing 4 as well as at one side thereof perpendicular to the front side. The disc tray 3 taken out of the disc housing 4 is inserted into the tray holding space 135 through the opening at the front of the clamping unit 132.

The bottom plate 134 of the clamping unit 132 has provide on the top surface thereof a guide projection 136 to guide the disc tray 3 into the tray holding space 135. The guide projection 136 is engaged in the guide recess 17 of the disc tray 3 to guide the disc tray 3 for insertion into or removal from the tray holding space 135. The bottom plate 134 of the clamping unit 132 has formed therein an opening 137 through which the optical disc 2 set on the disc tray 3 held in the tray holding space 135 can be viewed from the optical pickup 113 located below. The opening 137 is large enough not to limit the bottom opening 137 formed in the disc tray 3 and through which the optical disc 2 can also be viewed from the optical pickup 113 located below.

The top plate 133 of the clamping unit 132 has installed nearly in the middle thereof a clamping plate 138 to clamp the optical disc 2 set on the disc tray 3 on the disc table 114 of the disc spinner 112. The clamping plate 138 is shaped like a disc having a generally same size as the disc table 114 on which the optical disc 2 is set. When the clamping unit 132 is supported on the chassis 30, it is set to oppose the disc table 114 of the disc spinner 112 with the center of rotation of the clamping plate 138 made to coincide with that of the disc table 114.

The clamping unit 132 has a first pair of right and left support projections 139a and 139b and a second pair of right and left support projections 141a and 141b provided at the lower opposite ends thereof, respectively. The clamping unit 132 is supported on a pair of right and left lifting plates 142a and 142b by means of the first pair of support projections 139a and 139b and the second pair of support projections 141a and 141b. Namely, the clamping unit 132 is supported between the side walls 30a and 30b of the chassis 30 by means of the lifting plates 142a and 142b, and moved up and down in a direction toward and away from the bottom 30c of the chassis 30.

The first pair of support projections 139a and 39b and second pair of support projections 141a and 141b are inserted into lifting guide slots 143 formed vertically in the side walls 30a and 30b. Thus with the support projections guided along the slots 143, the clamping unit 131 is moved up and down in the directions of arrows $C_1$ and $C_2$ in FIG. 7.

Figure 7:
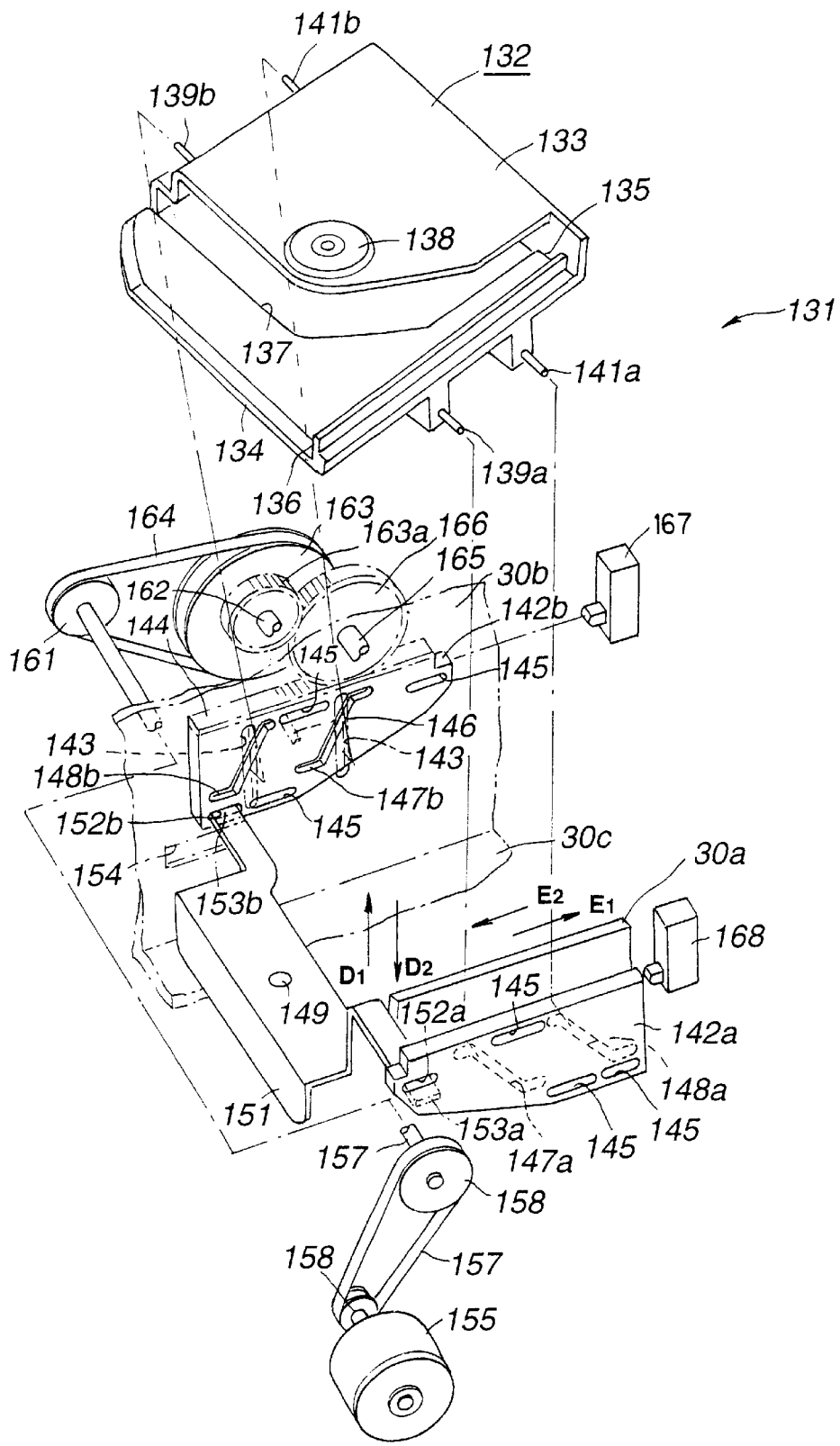
FIG. 7 is an exploded perspective view of an optical disc clamping mechanism, showing the essential parts thereof selected for the purpose of explanation.

The clamping unit 132 is moved upward in the direction of arrow $D_1$ in FIG. 7, to a height corresponding to the moving block 83 of the loading mechanism 81, namely, to a position where the disc tray 3 taken out of the disc housing 4 by the moving block 83 can be inserted horizontally into the tray holding space 135 through the open front of the tray holding space 135. Also the clamping unit 132 is moved downward in the direction of arrow $D_2$ in FIG. 7 to a height where the optical disc 2 set on the disc tray 3 held in the tray holding space 135 can be set onto the disc table 114 of the disc spinner 112. At this time, the clamping unit 132 cooperates with the disc table 114 to catch the circumference of the center hole 2a in the optical disc 2 set on the disc table 114, and clamp the optical disc 2 together with the disc table 114. The disc table 114 incorporates a magnet to attract the clamping plate 138 formed from a magnetic material such as metal plate, and cooperates with the clamping plate 138 to catch the optical disc 2.

There is disposed on the outer surface of the side walls 30a and 30b of the chassis 30 a pair of right and left lifting plates 142a and 142b to move up and down the clamping unit 132. The lifting plates 142a and 142b are supported movably toward the front and rear of the enclosure 7 in the directions of arrows $E_1$ and $E_2$ in FIG. 7. The right and left lifting plates 142a and 142b are shaped to have a same form. The lifting plate 142b has a rack gear 144 formed on the upper end face thereof and moving guide slots 145 formed in the upper and lower edge portions thereof, respectively, to guide the clamping unit 132 toward the front and rear of the enclosure 7. Support pins 146 provided on the side walls 30a and 30b are engaged in the guide slots 145 to allow the lifting plates 142a and 142b to be moved within a range defined by the guide slots 145.

A pair of inclined cam grooves 147a and 147b and another pair of inclined cam grooves 148a and 148b are formed in the surfaces of the lifting plates 142a and 142b opposite to the side walls 30a and 30b. The first support pin 139a of the clamping unit 132 inserted through the lifting guide slot 143 is engaged in the inclined cam groove 147a, the second support pin 141b inserted through the lifting guide slot 143 is engaged in the inclined cam groove 147b, the second support pin 141a inserted through the lifting guide slot 143 is engaged in the inclined cam groove 148a, and the first support pin 139b inserted through the lifting guide slot 143 is engaged in the inclined cam groove 148b. The inclined cam grooves 147a and 148a in the lifting plate 142a are formed to have inclined walls descending in the direction of arrow $E_1$ in FIG. 7 from the front to rear of the enclosure 7. The inclined cam grooves 147b and 148b in the lifting plate 142b are formed to have inclined walls descending in the direction of arrow $E_2$ from the rear to front of the enclosure 7.

Namely, at the side wall 30a, when the lifting plate 142a is moved in the direction of arrow $E_1$ in FIG. 7 toward the rear of the enclosure 7, the clamping unit 132 is moved upward in the direction of arrow $D_1$. When the lifting plate 142a is moved forward in the direction of arrow $E_2$, the clamping unit 132 is moved downward in the direction of arrow $D_2$. At the side wall 30b, when the lifting plate 142b is moved in the direction of arrow $E_2$ toward the front of the enclosure 7, the clamping unit 132 is moved upward in the direction of arrow $D_1$. When the lifting plate 142b is moved in the direction of arrow $E_1$ toward the rear of the enclosure 7, the clamping unit 132 is moved downward in the direction of arrow $D_2$.

The right and left lifting plates 142a and 142b are coupled to each other by a connecting arm 151 pivoted at the middle thereof to a support shaft 149 provided on the bottom 30c of the chassis 30 so that they can be moved in opposite directions, respectively. The lifting plates 142a and 142b have engagement slots 152a and 152b formed in one end portions thereof, respectively, and the side walls 30a and 30b have through-holes 154 formed therein. Opposing ends 153a and 153b of the connecting arm 151 are engaged into the engagement slots 152a and 152b, respectively, of the lifting plates 142a and 142b through the through-holes 154 in the side walls 30a and 30b.

There is installed on a base (not shown) provided on the side wall 30a a clamping drive motor 155 which drives to move the lifting plates 142a and 142b disposed at the side walls 30a and 30b, respectively, of the chassis 30 in opposite directions. More particularly, a driving force of the drive motor 155 is conveyed to a first transmission pulley 158 by a driving belt 157 wound over the pulley 158 and a driving pulley 156 installed to the drive shaft of the drive motor 155.

A transmission shaft 159 is rotatably supported on and between the side walls 30a and 30b, and the first transmission pulley 158 is installed to a transmission shaft 159 at the side wall 30a. A second transmission pulley 161 is installed to the transmission shaft 159 at the side wall 30b. A driven pulley 163 is rotatably installed on a support shaft 162 studded on the side wall 30b. A driving belt 164 is wound on the second transmission pulley 161 and drive pulley 163. The drive pulley 163 has a gear 163a formed integrally thereon. The gear 163a is in mesh with a transmission gear 166 rotatably supported on a support shaft 165 provided on the side wall 30b. The transmission gear 166 is in turn in mesh with the rack gear 144 on the lifting plate 142b disposed along the side wall 30b.

The lifting plate 142b disposed along the side wall 30a is driven by the clamping drive motor 155 to move forward in the direction of arrow $E_1$ and backward in the direction of arrow $E_2$ in FIG. 7,while the lifting plate 142a disposed along the side wall 30b is moved by the coupling arm 151 in the directions of arrows $E_1$ and $E_2$ opposite to the moving directions of the lifting plate 142b. Since th lifting plates 142a and 142b are thus moved in opposite directions, the clamping unit 132 is moved up and down, namely, in the directions of arrows $D_1$ and $D_2$, while being kept in horizontal position, between a position where the disc tray 3 taken out of the disc housing 4 by the loading mechanism 81 can be inserted into the tray holding space 135, and a position where an optical disc 2 placed on the disc tray 3 held in the tray holding space 135 can be transferred onto the disc table 114.

There is disposed in a position opposite to the rear end of the lifting plate 142b an optical disc position detecting microswitch 167 to detect when an optical disc 2 placed on the disc tray 3 is set on the disc spinner 112. The disc position detecting switch 167 is pressed by the rear end of the lifting plate 142b when the clamping unit 132 has been moved downward in the direction of arrow $D_2$ in FIG. 7 to a height where the optical disc 2 on the disc tray 3 held on the clamping unit 132 can be transferred onto the disc table 144. There is also provided in a position corresponding to the rear end of the lifting plate 142a disposed along the side wall 30a a tray loading/unloading position detecting microswitch 168 which detects when the clamping unit 132 has been moved to a position where the disc tray 3 taken out of the disc housing 4 by the loading mechanism 81 can be received or when the disc tray 3 held in the tray holding space 135 can be received into the disc housing 4. The tray loading/unloading position detecting switch 168 is pressed by the rear end of the lifting plate 142a when the clamping unit 132 has been moved upward in the direction of arrow $D_1$ in FIG. 7 to a height at which the disc tray 3 can be taken out of the disc housing 4 or returned into the disc housing 4 by the loading mechanism 81.

Next, an ejecting mechanism 171 to eject the disc tray 3 from the disc housing 4 to outside the enclosure 7 through the disc slot 8 will be described here below with reference to FIG. 8.

Figure 8:
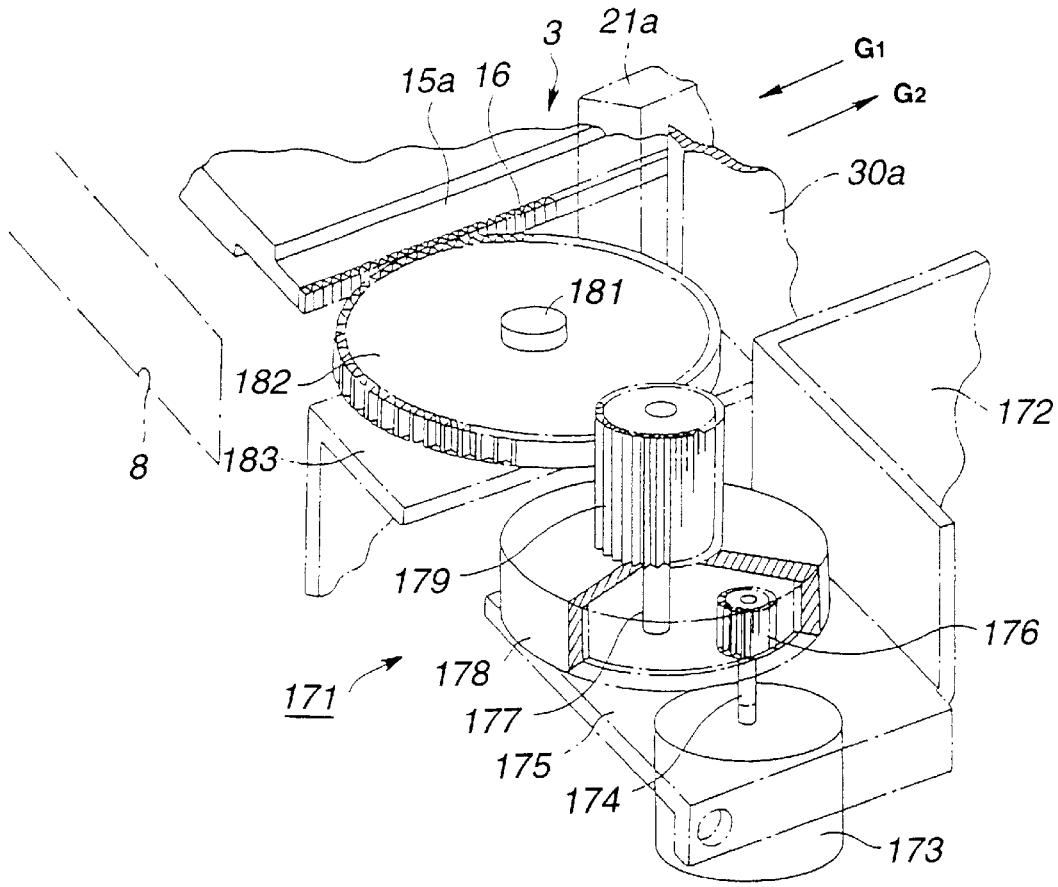
FIG. 8 is a perspective view of a disc tray ejecting mechanism, showing the essential parts thereof selected for the purpose of explanation.

As shown in FIG. 8, the ejecting mechanism 171 comprises an ejecting drive motor 173 installed on a mount base 172. The motor 173 is fixed to a horizontal plate 175 formed by bending the forward end portion of the mount base 172 with a driving shaft of the motor 173 directed upward, as will be seen from FIG. 8. A drive gear 176 is installed on the drive shaft 174 of the ejecting drive motor 173. The drive gear 176 is in mesh with a cylindrical gear 178 having a gear, namely, teeth, formed on the inner circumference thereof and pivoted on a support shaft 177 studded on the horizontal plate 175. The cylindrical gear 178 has a transmission gear 179 formed coaxially and integrally therewith. The transmission gear 178 is in mesh with a pinion 182 pivoted on a support shaft 181 studded on the side wall 30a. The support shaft 181 supporting the pinion 182 is studded on a horizontal plate 183 formed from a bent front end portion of the side wall 30a.

As shown in FIG. 8, the pinion 182 is in mesh with the front portion of the rack gear 16 of a one of the disc trays 3 accommodated in the disc housing 4 that is selected for ejection to outside the enclosure 7. It depends on the height of the disc housing 4 which one of the disc trays 3 in the disc housing 4 is aligned with the pinion 182 which is to be in mesh with the rack gear 16 of that disc tray. The pinion 182 comes into the disc housing 4 through a front cut formed in the side walls 21a of the disc housing 4.

When the disc housing 4 is lifted by the lifting mechanism 6, the disc tray 3 inside the disc housing 4 is moved with its rack gear 16 thereof sliding on the pinion 182. A disc tray 3 having the rack gear 16 with which the pinion 182 is in mesh is thus selected for ejection from the disc housing 4. The disc tray 3 thus selected by the ejecting mechanism 171 is not any one which will be taken out of the disc housing 4 by the loading mechanism 81. That is, the ejecting mechanism 171 will select a disc tray 3 which is stored at a one-step lower level than a one which will be selected by the loading mechanism 81.

Figure 9:
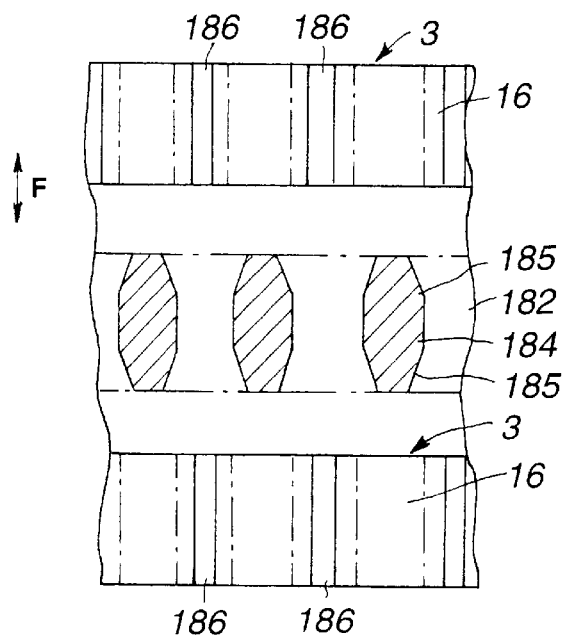
FIG. 9 schematically illustrates the relationship between a transmission gear of the disc tray ejecting mechanism and a rack gear of the disc tray.

As shown in FIG. 9, each of the teeth 184 of the pinion 182 is tapered at either end portion thereof as indicated with references 185. Therefore, when the disc tray 3 accommodated in the disc housing 4 is moved in the direction of arrow F in FIG. 9 in relation to the pinion 182, a tooth, or gear, 186 of each rack gear 16 can smoothly enter between the teeth, or gears 184, of the pinion 182. Thus, the disc housing 4 can be smoothly moved up and down.

The disc tray 3 selected by the ejecting mechanism 171 is taken out of the disc housing 4 by means of the rack gear 16 thus driven by the ejecting drive motor 173, moved in the direction of arrow $G_1$ in FIG. 8 and then ejected out of the enclosure 7 from the disc slot 8. After that, as driven by the drive motor 173, the disc tray 3 is moved in the direction of arrow $G_2$ in FIG. 8 and into the disc housing 4.

Next, a locking mechanism 191 to lock the disc housing 4 will be described hereinbelow with reference to FIG. 10. The locking mechanism 191 is intended to prevent the lifting plate 34 of the lifting mechanism 6 from being dislocated due to external vibration applied to the enclosure 7 during shipping from factory and thus the disc housing 4 from also being dislocated. The locking mechanism 191 comprises a locking member 194 which is to be inserted into a locking hole 193 formed in a bottom 192a of an outer casing 192 of the enclosure 7.

The locking member 194 includes a generally cylindrical locking head 195 and a handling head 198 which is to be operated by the user. The locking head 195 has a pair of stoppers 197. The locking hole 193 is provided in a position where the locking head 195 of the locking member 194 introduced in the locking hole 193 abuts the front end of the lifting plate 34 when the lifting plate 34 is in the initial position where it is nearest to the rear of the enclosure 7. The locking hole 193 has formed therein a pair of slits 196 corresponding to the pair of stoppers 197.

The locking mechanism 191 is used as follows. That is, before shipment of the disc changer 1 from the factory, the lifting plate 34 is set in the initial position where it is nearest to the rear of the enclosure 7, and the locking head 195 of the locking member 194 is inserted from the locking hole 193. By turning the introduced locking member 194, the stoppers 197 are engaged on the circumferential edge of the locking hole 193. Thus, the lifting plate 34 is locked against movement toward the front of the enclosure 7 and the disc housing 4 from wobbling.

Figure 11:
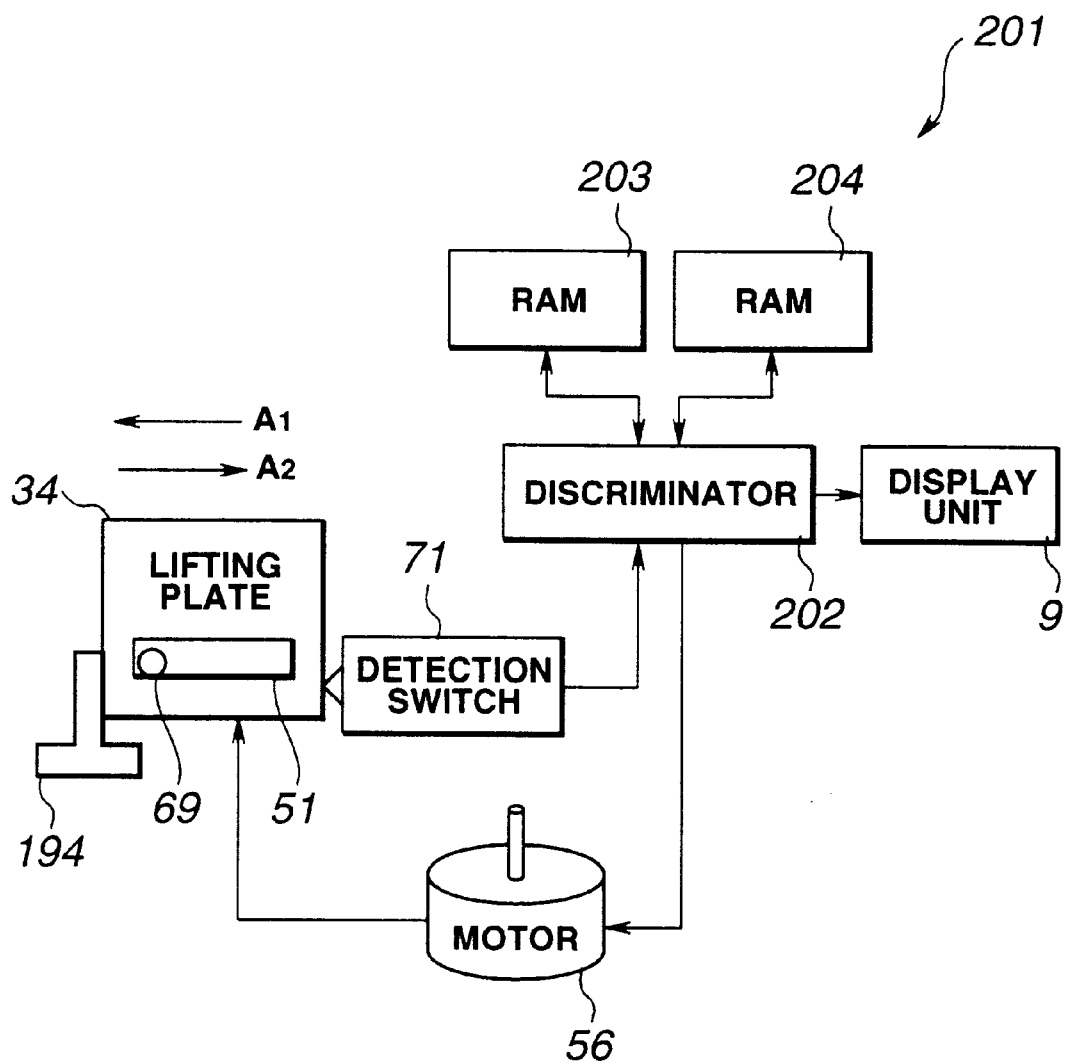
FIG. 11 is a schematic block diagram of an alarming circuit which reminds the user that the locking member must be removed.

The locking mechanism 191 includes an alarming circuit 201 which reminds the user of removing the locking member 194. The user going to use the disc changer 1 delivered to him may possibly forget to remove the locking member 194. In this case, the electronic apparatus will of course be stalled and the user may possibly believe that the disc changer 1 itself has got faulty. The alarming circuit 20 as shown in FIG. 11 is provided to avoid forgetting to remove the locking member 194.

During initialization after the main power supply is connected to the disc changer 1 after delivery from the factory, the alarming circuit 201 comprises a discriminator 202 to judge whether the lifting plate 34 is locked, by the locking member 194, in the initial position where it is nearest to the rear of the enclosure 7. The initialization is such that the lifting plate 34 is moved from the initial position to a position nearest to the front of the enclosure 7 and then returned to the initial position again to detect the position of the lifting plate 34. More particularly, during the initialization of the lifting mechanism 6 of the disc housing 4, the discriminator 202 judges, based on an output signal from the initial position detecting switch 71, whether the lifting plate 34 stays in the initial position for more than a predetermined time. Also the discriminator 202 controls the display unit 9 and lifting drive motor 56.

The alarming circuit 201 also comprises a RAM 203 which stores a factory-set status information indicating whether the disc changer 1 remains as set at factor before shipment. At the shipment of the disc changer 1 from factory, a data "0000", for example, is stored into the RAM 203 as a factory-set status information indicating that the disc changer 2 remains as set at factory. When the user connects the main power supply to the disc changer 1 delivered to him, the data "0000" stored in the RAM 203 and indicating that the disc changer 1 remains as set at factory is rewritten to a data "0101", for example, indicating that the dis changer 1 has been operated by the user. The content of the RAM 203 is judged by the discriminator 202.

The alarming circuit 201 further comprises a RAM 204. The RAM 204 has set therein a flag indicating that the factory-set status information in the RAM 203 is "0000" indicating that the disc changer 1 remains as set at factory. The flag is discriminated by the discriminator 202.

The alarming circuit 201 is supplied with an output signal from the initial position detecting switch 71. When the lifting plate 34 is moved to a position nearest to the rear of the enclosure 7, the switch 71 is pressed by the rear end face of the lifting plate 34 to detect the initial position of the lifting plate 34. During the initialization of the lifting mechanism 6, when the lifting plate 34 is locked at the initial position by the locking member 194, the initial position detecting switch 71 outputs continuously for more than a predetermined time a signal indicating that the lifting plate 34 is in the initial position. The predetermined time is 6 or 12 sec, for example.

In the alarming circuit 201, when the lifting plate 34 stays at the initial position for more than the predetermined time, namely, when the output signal from the detecting switch 71 lasts for more than the predetermined time, a signal is supplied from the discriminator 202 to the display unit 9 provided at the front of the enclosure 7 and which provides an alarming indication. It should be noted that the means of giving an alarm to the user is not limited to the display unit 9 but may be an alarm sound or illumination.

Figure 12:
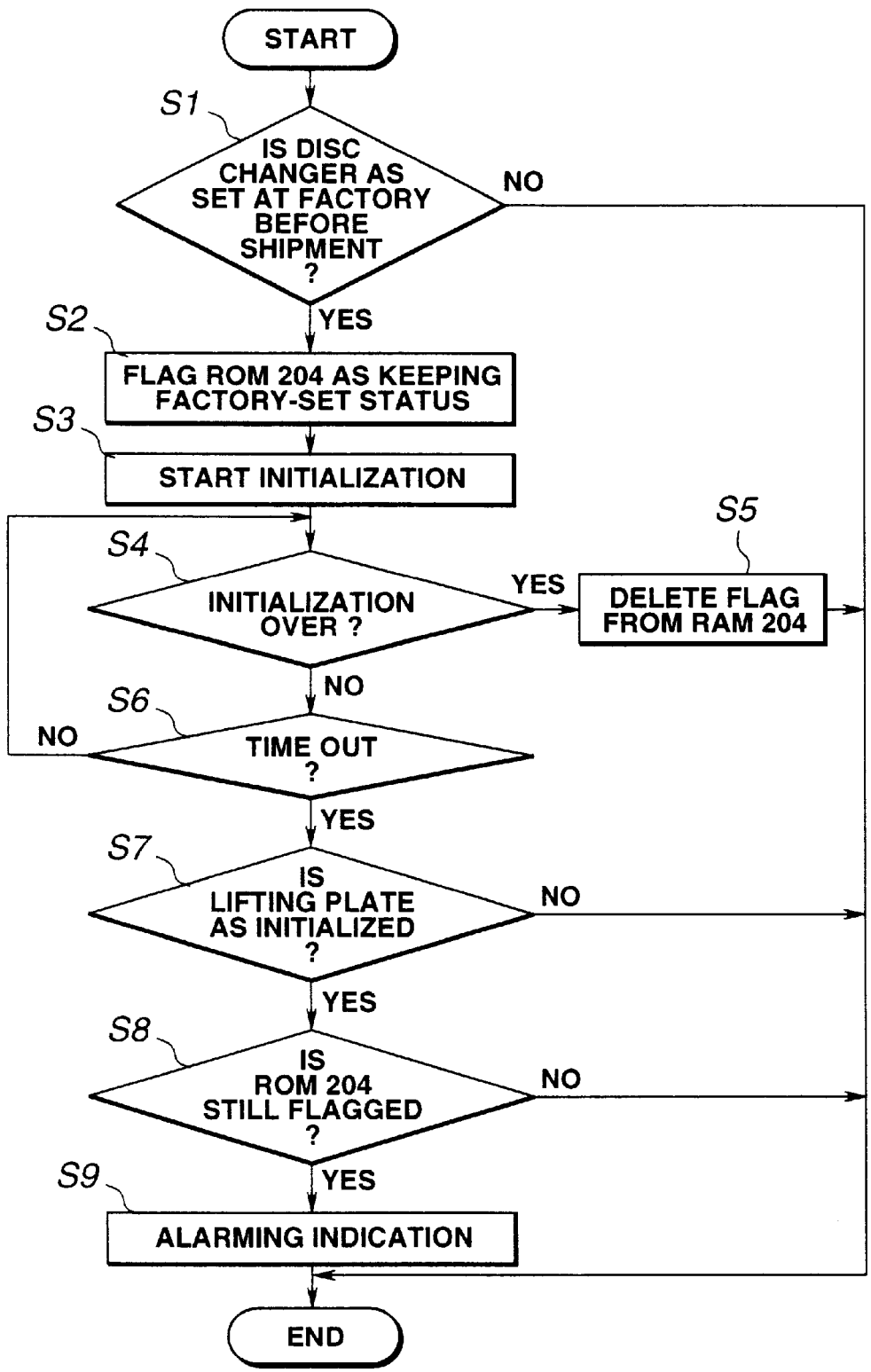
FIG. 12 is a functional flow chart showing the operations of the alarming circuit.

The alarming circuit 201 to remind the user of removing the locking member 194 functions as will be described below with reference to FIG. 12. First at step S1, the discriminator 202 judges whether the disc changer 1 remains as set at factory. The disc changer 1 is shipped from factory with the lifting plate 34 set in a position nearest to the rear of the enclosure 7 and the disc housing 4 set at the lowest step. At step S1, the discriminator 202 checks the factory-set status information in the RAM 203. When the factory-set status information stored in the RAM 203 is "0000" indicating that the disc changer 1 is as set at factory, for example, the discriminator 202 goes to step S2. If the factory-set status information is "0101" indicating that the disc changer 1 has been used by the user, the discriminator 202 quits the operation.

At step S2, the discriminator 202 sets in the RAM 204 a flag indicating that the disc changer 1 is as set at factory, and goes to step S3.

At step S3, the discriminator 202 puts the lifting drive motor 56 into run to move the lifting plate 34 in the direction of arrow $A_1$ in FIGS. 4(A) and 11 and start the initialization for detection of the position of the lifting plate 34, and then goes to step S4.

At step S4, the discriminator 202 judges whether the initialization of the lifting mechanism 6 has smoothly been completed. If the lifting mechanism 6 has smoothly been initialized, the discriminator 202 goes to step S5. If not, it goes to step S6. At step S5, the discriminator 202 stops operation by resetting for erasure or deletion of the flag set in the RAM 204 at step S2.

At step S6, the discriminator 202 judges, based on the output signal from the detecting switch 71, whether the lifting plate 34 is locked for the predetermined time. More particularly, if the lifting plate 34 does not move and the initial position detecting switch 71 is continuously pressed for more than the predetermined time, the discriminator 202 goes to step S7. If the switch 71 has been pressed for less than the predetermined time, the discriminator 202 returns to step S4.

At step S7, the discriminator 202 judges, based on the output signal from the detecting switch 71, whether the lifting plate 34 is in the initial position. Namely, if the initial position defecting switch 71 is not pressed by the lifting plate 34 and the lifting plate 34 is not in the initial position, it will be considered that the lifting plate 34 has been stalled and faulty for any mechanical and electrical reasons in the course of the initialization. So, the discriminator 202 judges, based on the output signal from the detecting switch 71, whether the lifting plate 34 is inoperably locked by the locking member 194 or it has become faulty due to any other mechanical and electrical trouble of the lifting mechanism 6. When the detecting switch 71 is pressed by the lifting plate 34, the discriminator 202 decides, based on the output signal from the position defecting switch 71, that the lifting plate 34 is in the initial position, and goes to step S8. If the lifting plate 34 is not in the initial position, the discriminator 202 decides that the lifting plate 34 has been inoperable for any other reason than the locking of the lifting plate 34, and quits the operation.

At step S8, the discriminator 202 checks for the flag having been set in the RAM 204 at step S2. If the flag exists, the discriminator 202 goes to step S9. If no flag is found, the discriminator 202 quits the operation.

At step S9, the discriminator 202 decides that the locking member 194 is installed to the bottom of the enclosure 7, and delivers an alarming indication at the display unit 9. Thus, the user can recognize that the disc changer 1 cannot be initialized because of the locking member 194 still installed on the bottom of the enclosure 7. Thereafter, the user will remove the locking member 194 from the bottom of the enclosure 7, and thus he can operate the disc changer 1 normally.

The disc changer 1, in which the disc tray 3 ejected from the enclosure 7 for replacement of an optical disc 2 set or held on the disc tray 3, will be discussed here below. Ejection of the disc tray 3 at the uppermost first address in the disc housing 4 will be described by way of example.

Figure 13:
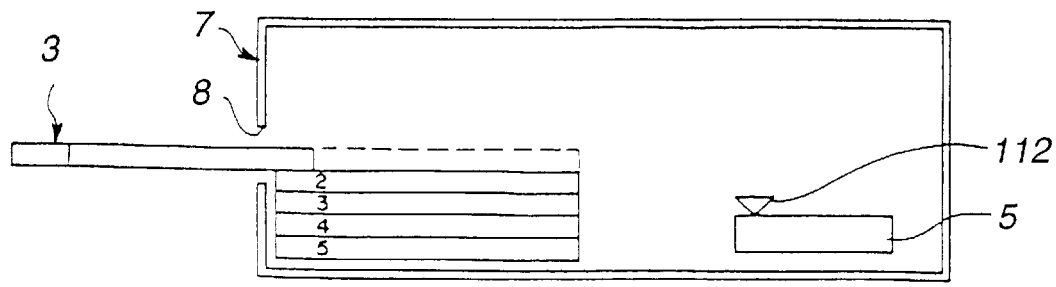
FIG. 13 is a schematic side elevation of the disc changer, showing a first-address disc tray projected from the enclosure.

For ejection of the uppermost first-address disc tray from the enclosure 7, the disc housing 4 is moved to the lowest position in the enclosure 7 as shown in FIG. 13. Namely, the supporting plate 33 of the lifting mechanism 6 is moved in the direction of arrow $A_1$ in FIG. 4(A) to the supported position at the rear of the enclosure 7. Therefore, the first support pins 25a and 25b and second support pins 26a and 26b are engaged in the concavity defined by the lowest support projections 38a and 38b, and lower side edges of the openings 37a and 37b. The lifting plate 34 has been moved most in the direction of arrow $A_1$ in FIG. 4(A), and the second support pins 26a and 26b are engaged in the horizontal steps 55a of the cam groove 55 in the lifting plate 34.

Figure 14:
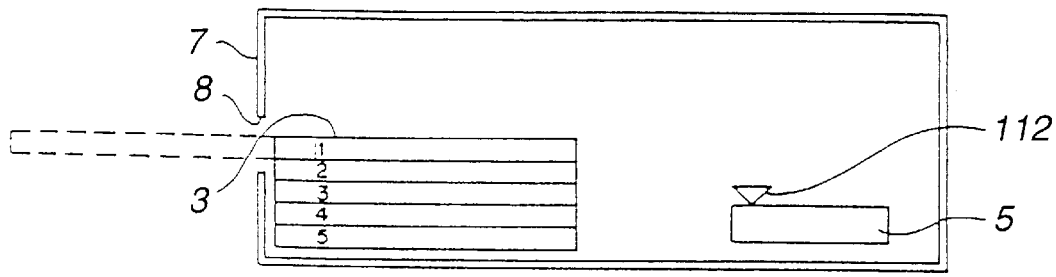
FIG. 14 is a schematic side elevation of the disc changer, showing the first-address disc tray in the stored position inside the disc housing.

At the same time, the pinion 182 of the ejecting mechanism 171 is in mesh with the rack gear 16 on the first-address disc tray 3. The disc tray 3 is driven by the ejecting drive motor 173 to move in the direction of arrow $G_1$ in FIG. 8 and thus ejected out of the enclosure 7 through the disc slot 8. With the first-address disc tray 3 thus taken out, the optical disc 2 on the disc tray 3 can be replaced by the user. After the replacement of the optical disc 2, the ejecting mechanism 171 puts the ejecting drive motor 173 into reverse run to take into the disc housing 4 the disc tray 3 ejected from the enclosure 7 and to the first-address position inside the disc housing 4 as shown in FIG. 14.

Figure 15:
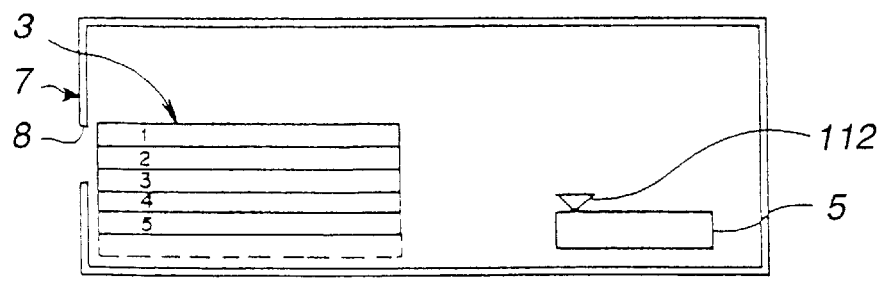
FIG. 15 is a schematic side elevation of the disc changer, showing the the first-address disc tray in a position from which it can be pulled into a tray holding space of an optical clamping unit.
Figure 16:
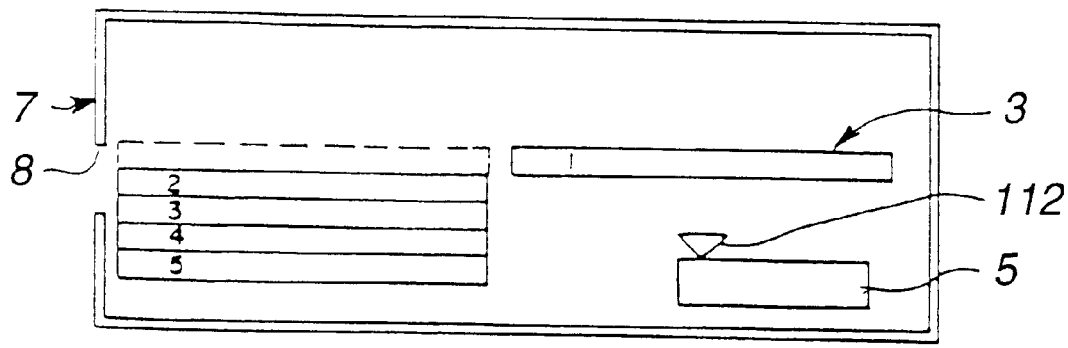
FIG. 16 is a schematic side elevation of the disc changer, showing the first-address disc tray in the tray holding space of the optical disc clamping unit.

Next, reproduction of information signal recorded in the optical disc 2 in the disc housing 4 will be described. Reproduction of data from an optical disc on a disc tray at the first address in the disc housing 4 will be discussed by way of example. For this reproduction, the disc housing 4 is lifted one step up from the lowest position to eject the first-address disc tray 3 as show in FIG. 15. Namely, as shown in FIGS. 4(B) and 4(C), the lifting drive motor 56 is put into run to move the supporting plate 33 of the lifting mechanism 6 in the direction of arrow $A_2$ to the unsupported position. Thus, the first support pins 25a and 25b and second support pins 26a and 26b are moved to the unsupported positions where they are not supported on the support projections 38a and 38b. Also, the lifting gear 68 is rotated in one direction to move the lifting plate 34 in the direction of arrow $A_2$ in FIG. 4(A). The second support pins 26a and 26b are moved over the slope 55b of the cam groove 55 to a next horizontal step 55a. Thus, the disc housing 4 is raised to a one-step higher position by the first and second pivot arms 41 and 42. The supporting plate 33 is thus moved in the direction of arrow $A_1$ in FIG. 4(A) back to the supported position. Thus, the disc housing 4 is supported at a height where the first-address disc tray 3 can be inserted into the tray holding space 135 of the clamping unit 132 as shown in FIG. 16, and the engagement projection 85 on the moving block 83 of the loading mechanism 81 is engaged into the engagement cut 18 in the first-address disc tray 3 as shown in FIG. 15.

The first-address disc tray 3 is transferred from the stored position in the disc housing 4 into the tray holding space 135 of the clamping unit 132 where it is held. Namely, as shown in FIG. 5, the loading mechanism 81 puts the loading drive motor 87 into run to move the moving block 83 in the direction of arrow $C_1$ to a position at the disc housing 4 and thus the first-address disc tray 3 is inserted into the tray holding space 135.

Figure 17:
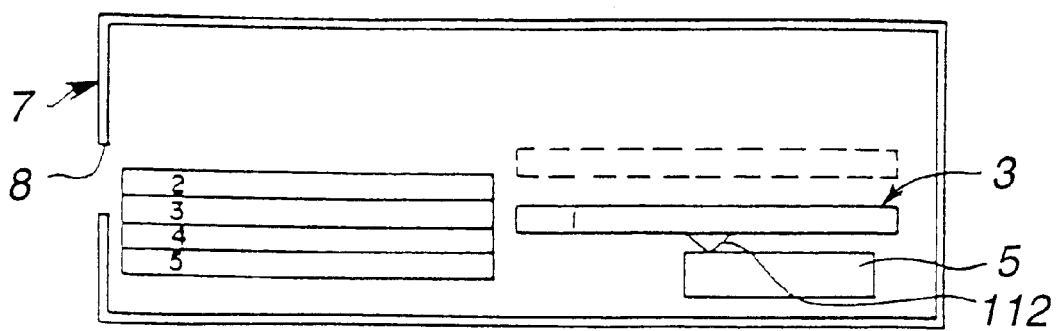
FIG. 17 is a schematic side elevation of the disc changer, showing the first-address disc tray in the playing position.

As shown in FIG. 17, when the clamping unit 132 of the clamping mechanism 131 carrying the first-address disc tray 3 is moved to under the reproducing unit 5, the first-address optical disc 2 is set onto the disc spinner 112. As shown in FIG. 7, when the clamping drive motor 155 is put into run, the lifting plate 142a is moved forward in the direction of arrow $E_2$ while the lifting plate 142b is moved rearward in the direction of arrow $E_1$, the clamping unit 132 is moved downward in the direction of arrow $D_2$. Thus, the optical disc 2 held on the first-address disc tray 3 has engaged in the center hole 2a thereof the centering member 116 of the disc table 114 and the circumference of the center hole 2a is caught by the disc table 114 and clamping plate 138, as shown in FIGS. 6 and 7. Thus the optical disc 2 is ready to spin. When the user starts a data reproduction by operating the control panel provided at the front of the enclosure 7, the optical disc 2 is driven to spin by the spindle motor 115, and the optical pickup 113 is fed radially of the optical disc 2 to read information signal recorded on the optical disc 2.

For returning the optical disc 2 set in the reproducing unit 5 back into place inside the disc housing 4, the clamping drive motor 155 is first put into reverse run. The lifting plate 142a is moved rearward in the direction of arrow $E_1$ while the lifting plate 142b is moved forward in the direction of arrow $E_2$, and thus the clamping unit 132 is moved upward in the direction of arrow $D_1$, as shown in FIG. 7. Thus, the first-address disc tray 3 is moved to a position where it can be transferred from inside the tray holding space 135 of the clamping unit 132 to the first address in the disc housing 4. The engagement projection 85 on the moving block 83 of the loading mechanism 81 is engaged into the engagement cut 18 in the disc tray 3. As shown in FIG. 5, the loading mechanism 81 will put the loading drive motor 87 into reverse run to move the moving block 81 in the direction of arrow $C_2$ in FIG. 5 to a position at the disc housing 4, thereby moving the first-address disc tray 3 into place inside the disc housing 4.

Figure 10:
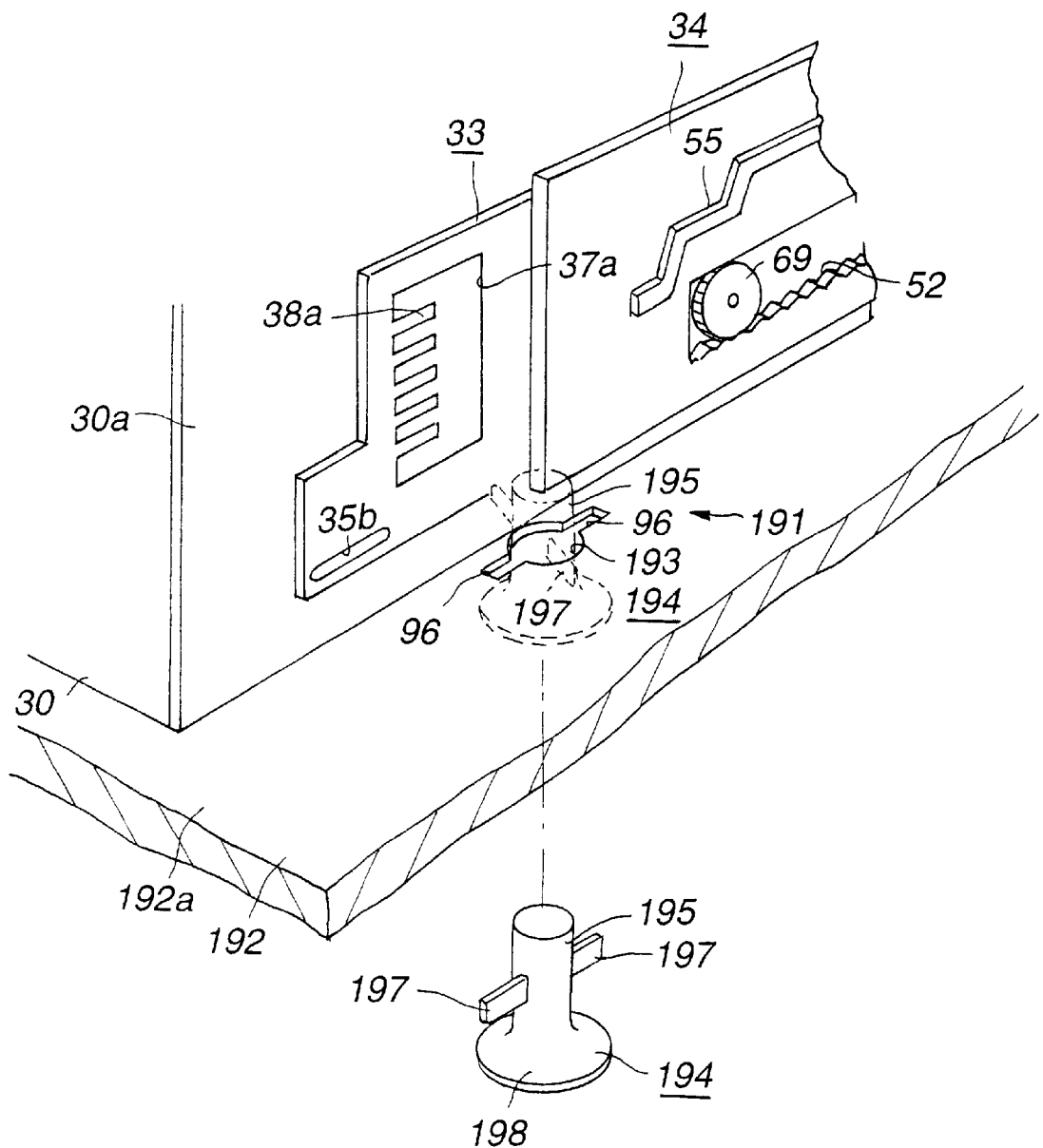
FIG. 10 is a perspective view of a locking mechanism to lock a lifting control plate against dislocation from its initial position.

As shown in FIGS. 10 and 11, in the disc changer I delivered to the user from factory, the locking member 194 is found installed to the bottom of the enclosure 7 to lock the lifting plate 34 of the lifting mechanism 6 against dislocation and prevent the disc housing 4 from being wobbled and also to protect the disc changer 1 from being faulty during the shipment. When the user uses initially the disc changer 1 received, he will remove the locking member 194 of the locking mechanism 191 from the bottom of the enclosure 7 before starting use of the disc changer 1. If he forgets to remove the locking member 194 from the bottom of the enclosure 7 and connects the main power supply to the apparatus, the alarming circuit 201 is actuated to remind or alarm the user of removing the locking member 194 of the locking mechanism 191 without fail. Namely, when the user starts using the disc changer 1 initially by connecting the main power supply to the disc changer 1 with the locking member 194 left installed, the discriminator 202 judges, based on the output signal from the detecting switch 71, whether the lifting plate 31 of the lifting mechanism 6 stays locked for more than the predetermined time. If the lifting mechanism 6 is inoperable because it is locked by the locking member 194, the discriminator 202 delivers an alarm on the display unit 9. Thus, the user can know why the disc changer 1 cannot operate even the main power supply is connected to the disc changer 1 and that it is because the lifting mechanism 6 is locked by the locking member 194.

By reinstalling the locking member 194 in the locking hole 193 in the bottom of the enclosure 7 when the user is going to relocate carrying the disc changer 1 having been initially used, the lifting plate 34 can be locked against dislocation and the disc housing 4 can be prevented from being wobbled and also the disc changer 1 can be protected from any failure during transportation. Also by holding the disc housing 4 at the lowest step where it can support itself mot stably during transportation, it is possible to prevent the disc housing 4 from being wobbled due vibration applied during transportation. Thus the apparatus can be protected against failure.

In the foregoing, the disc changer 1 according to the present invention has been described. However, the present invention is not limited to the disc changer having the construction having been described in the foregoing but it may be applied to a disc changer constructed as will be set forth below. Namely, the disc housing 4 is fixed to the enclosure while the reproducing unit to read an optical disc 2 is installed movably. Also, the reproducing unit may be installed on the lifting mechanism, which will thus result in a vertically movable reproducing unit. The disc changer 1 is not applicable only to a recording and/or reproducing apparatus for read-only optical discs, but it may be applied to a recording/reproducing apparatus for recordable optical discs, for example, phase-change optical discs.

The present invention is not limited to the initialization after the initial connection of the main power supply by the user to the disc changer delivered from factory, but the locking member 194 may be used for transport of the disc changer for the reason of removal or relocation to lock the lifting mechanism and an alarm may be issued to the user forgetting to remove the locking member 194 from the enclosure 7.

Also, the present invention is not limited to a disc changer, but it may be applied to a writing and/or reading apparatus for other recording media, and a moving mechanism of a printing head of a printer, for example.

What is claimed is:

1. An electronic apparatus, including:
   a moving unit provided movably in relation to an enclosure;
   a locking mechanism adapted to lock the moving unit against dislocation from its initial position relative to the enclosure;
   an output unit to issue an alarm; and
   a control unit to judge whether the moving unit stays at its initial position for more than a predetermined time and control the output unit to issue an alarm, when the result of judgement is such that the moving unit stays at the initial position for more than the predetermined time.

2. The apparatus of claim 1, wherein the control unit is adapted to allow the moving unit to start moving in relation to a main body of the electronic apparatus when a main power supply is initially connected to the electronic apparatus and judge whether the moving unit stays at the initial position for more than the predetermined time.

3. The apparatus of claim 2, wherein the control unit comprises a detector to detect whether the moving unit is at the initial position, and a discriminator to judge, based on a signal from the detector, whether the moving unit is at the initial position.

4. The apparatus of claim 3, wherein the control unit is adapted to allow the moving unit to start moving in relation to the main body of the electronic unit when the main power supply is initially connected to the electronic apparatus and then decide, when the discriminator has decided that the moving unit is not at the initial position, that any external factor other than the locking mechanism has caused an error.

5. The apparatus of claim 2, wherein the control unit further comprises a memory unit having stored a factory-set status information at the shipment of the electronic apparatus from factory and adapted to have the factory set status information rewritten by the control unit to an information indicating that the electronic apparatus has been used, when the main power supply is initially connected to the electronic apparatus.

6. The apparatus of claim 5, wherein the control unit is adapted to judge, when the factory-set status information is stored into the memory unit, whether the moving unit stays at the initial position for more than the predetermined time.

7. The apparatus of claim 1, wherein the locking mechanism comprises a locking member removably installed in a main body of the electronic apparatus to lock the moving unit.

8. The apparatus of claim 7 wherein the control unit is adapted to allow the moving unit to start moving in relation to the main body of the electronic apparatus when a main power supply is initially connected to the electronic apparatus and judge whether the moving unit stays at the initial position for more than the predetermined time.

9. The apparatus of claim 8 wherein the control unit comprises a detector to detect whether the moving unit is at the initial position, and a discriminator to judge, based on a signal from the detector, whether the moving unit is at the initial position.

10. The apparatus of claim 9 wherein the control unit is adapted to allow the moving unit to start moving in relation to the main body of the electronic unit when the main power supply is initially connected to the electronic apparatus and then decide, when the discriminator has decided that the moving unit is not at the initial position, that any external factor other than the locking mechanism has caused an error.

11. The apparatus of claim 8 wherein the control unit further comprises a memory unit having stored a factory-set status information at the shipment of the electronic apparatus from factory and adapted to have the factory set status information rewritten by the control unit to an information indicating that the electronic apparatus has been used, when the main power supply is initially connected to the electronic apparatus.

12. The apparatus of claim 11 wherein the control unit is adapted to judge, when the factory-set status information is stored into the memory unit, whether the moving unit stays at the initial position for more than the predetermined time.

13. A method of controlling an electronic apparatus including a moving unit provided movably in relation to an enclosure and a locking mechanism to lock the moving unit against dislocation from its initial position relative to the enclosure, the method comprising the steps of:

judging whether the moving unit stays at its initial position for more than a predetermined time;

deciding, when the result of judgement is such that the moving unit stays at the initial position for more than the predetermined time, that the moving unit is locked by the locking mechanism; and issuing an alarm.

14. The method of claim 13, wherein the moving unit is allowed to start moving in relation to a main body of the electronic apparatus when a main power supply is initially connected to the electronic apparatus and it is judged whether the moving unit stays at the initial position for more than the predetermined time.

15. The method of claim 14, wherein the moving unit is allowed to start moving in relation to the main body of the electronic unit when the main power supply is initially connected to the electronic apparatus and then it is decided, when a discriminator has decided that the moving unit is not at the initial position, that any external factor other than the locking mechanism has caused an error.

16. The method of claim 14, wherein a factory-set status information stored in a memory at the shipment of the electronic apparatus from factory is rewritten to an information indicating that the electronic apparatus has been used, when the main power supply is initially connected to the electronic apparatus.

17. The method of claim 16, wherein it is judged, when the shipment information is stored into the memory, whether the moving unit stays at the initial position for more than the predetermined time.

18. A recording and/or reproducing apparatus for recording media including:

a recording medium housing adapted to accommodate a plurality of trays each receiving a recording medium so that each tray can be moved between a position to be taken by the tray when taken out of the housing and a position to be taken by the tray when stored in the housing;

a unit to record and/or reproduce data into and/or from a recording medium set on a tray taken out of the housing;

a moving mechanism to move one of the trays between the taken-out and stored positions and also the housing and the unit to record and/or reproduce data in relation to each other;

a locking mechanism installed to an enclosure to lock the moving mechanism against dislocation from its initial position relative to the enclosure;

an output unit to issue an alarm; and a control unit to judge whether the moving mechanism stays at its initial position for more than a predetermined time and control the output unit to issue an alarm, when the result of judgement is such that the moving mechanism stays at the initial position for more than the predetermined time.

19. The apparatus of claim 18, wherein the control unit is adapted to allow the moving mechanism to start moving in relation to a main body of an electronic apparatus when a main power supply is initially connected to the electronic apparatus and judge whether the moving mechanism stays at the initial position for more than the predetermined time.

20. The apparatus of claim 19, wherein the control unit comprises a detector to detect whether the moving mechanism is at the initial position, and a discriminator to judge, based on a signal from the detector, whether the moving mechanism is at the initial position.

21. The apparatus of claim 20, wherein the control unit is adapted to allow the moving mechanism to start moving in relation to the main body of the electronic unit when the main power supply is initially connected to the electronic apparatus and then decide, when the discriminator has decided that the moving mechanism is not at the initial position, that any external factor other than the locking mechanism has caused an error.

22. The apparatus of claim 20, wherein the moving mechanism comprises a lifting drive having a lifting plate adapted to move up and down the recording medium housing in relation to a writing and/or reading unit and which is moved by the control unit when the main power supply is initially connected to the writing and/or reading apparatus, and the detector is pressed by the lifting plate.

23. The apparatus of claim 22, wherein the locking mechanism comprises a locking member removably installed in the main body of the writing and/or reading unit to lock the lifting plate.

24. The apparatus of claim 19, wherein the control unit further comprises a memory unit having stored a factory-set status information at the shipment of the electronic apparatus from factory and adapted to have the factory-set status information rewritten by the control unit to an information indicating that the electronic apparatus has been used, when the main power supply is initially connected to the electronic apparatus.

25. The apparatus of claim 24, wherein the control unit is adapted to judge, when the factory-set status information is stored into the memory unit, whether the moving mechanism stays at the initial position for more than the predetermined time.

26. The apparatus of claim 18, wherein the locking mechanism comprises a locking member removably installed in a main body of an electronic apparatus to lock the moving mechanism.

27. The apparatus of claim 26 wherein the control unit is adapted to allow the moving mechanism to start moving in relation to the main body of the electronic apparatus when a main power supply is initially connected to the electronic apparatus and judge whether the moving mechanism stays at the initial position for more than the predetermined time.

28. The apparatus of claim 27 wherein the control unit comprises a detector to detect whether the moving mechanism is at the initial position, and a discriminator to judge, based on a signal from the detector, whether the moving mechanism is at the initial position.

29. The apparatus of claim 28 wherein the control unit is adapted to allow the moving mechanism to start moving in relation to the main body of the electronic unit when the main power supply is initially connected to the electronic apparatus and then decide, when the discriminator has decided that the moving mechanism is not at the initial position, that any external factor other than the locking mechanism has caused an error.

30. The apparatus of claim 28 wherein the moving mechanism comprises a lifting drive having a lifting plate adapted to move up and down the recording medium housing in relation to a writing and/or reading unit and which is moved by the control unit when the main power supply is initially connected to the writing and/or reading apparatus. and the detector is pressed by the lifting plate.

31. The apparatus of claim 27 wherein the control unit further comprises a memory unit having stored a factory-set status information at the shipment of the electronic apparatus from factory and adapted to have the factory-set status information rewritten by the control unit to an information indicating that the electronic apparatus has been used, when the main power supply is initially connected to the electronic apparatus.

32. The apparatus of claim 31 wherein the control unit is adapted to judge, when the factory-set status information is stored into the memory unit, whether the moving mechanism stays at the initial position for more than the predetermined time.

33. A method of controlling a recording and/or reproducing apparatus for recording media including a recording medium housing adapted to accommodate a plurality of trays each receiving a recording medium so that each tray can be moved between a position to be taken by the tray when taken out of the housing and a position to be taken by the tray when stored in the housing, a unit to record and/or reproduce data into and/or from a recording medium on a tray taken out of the housing, a moving mechanism to move one of the trays between the taken-out and stored positions, and also the housing and the unit to record and/or reproduce data in relation to each other, and a locking mechanism installed to an enclosure to lock the moving mechanism against dislocation from its initial position relative to the enclosure, the method comprising the steps of:

judging whether the moving mechanism stays at its initial position for more than a predetermined time; and deciding, when the result of judgement is such that the moving mechanism stays at the initial position for more than the predetermined time, that the moving mechanism is locked by the locking mechanism; and issuing an alarm.

34. The method of claim 33, wherein the moving mechanism is allowed to start moving in relation to a main body of an electronic apparatus when a main power supply is initially connected to the electronic apparatus and it is judged whether the moving mechanism stays at the initial position for more than the predetermined time.

35. The method of claim 34, wherein the moving mechanism is allowed to start moving in relation to the main body of the electronic unit when the main power supply is initially connected to the electronic apparatus and then it is decided, when a discriminator has decided that the moving mechanism is not at the initial position, that any external factor other than the locking mechanism has caused an error.

36. The method of claim 34, wherein a factory-set status information stored in a memory at the shipment of the electronic apparatus from factory is rewritten to an information indicating that the electronic apparatus has been used, when the main power supply is initially connected to the electronic apparatus.

37. The method of claim 36, wherein it is judged, when the shipment information is stored into the memory, whether the moving mechanism stays at the initial position for more than the predetermined time.

* * * * *